(12) United States Patent
Yu et al.

(10) Patent No.: US 7,805,349 B2
(45) Date of Patent: Sep. 28, 2010

(54) USING AN INSTANTIATED MODEL TO GENERATE AN APPLICATION-SPECIFIC DOCUMENT

(75) Inventors: Jay JieBing Yu, Carlsbad, CA (US); Kenichi Mori, Carlsbad, CA (US)

(73) Assignee: Intuit Inc., Mountain View, CA (US)

( * ) Notice: Subject to any disclaimer, the term of this patent is extended or adjusted under 35 U.S.C. 154(b) by 567 days.

(21) Appl. No.: 11/534,554

(22) Filed: Sep. 22, 2006

(65) Prior Publication Data

US 2007/0016607 A1    Jan. 18, 2007

Related U.S. Application Data

(63) Continuation of application No. 11/285,930, filed on Nov. 23, 2005, now abandoned.

(60) Provisional application No. 60/630,812, filed on Nov. 23, 2004.

(51) Int. Cl.
G06Q 40/00 (2006.01)
(52) U.S. Cl. .................................... 705/36 T
(58) Field of Classification Search ................ 705/36 T, 705/36
See application file for complete search history.

(56) References Cited

U.S. PATENT DOCUMENTS

| | | | |
|---|---|---|---|
| 5,249,300 A | | 9/1993 | Bachman et al. |
| 5,734,837 A | | 3/1998 | Flores et al. |
| 5,765,144 A | | 6/1998 | Larche et al. |
| 5,935,060 A | | 8/1999 | Iliff |
| 6,161,101 A | | 12/2000 | Guinta et al. |
| 6,253,192 B1 | | 6/2001 | Corlett et al. |
| 6,484,180 B1 | | 11/2002 | Lyons et al. |
| 6,684,188 B1 | * | 1/2004 | Mitchell et al. .......... 705/3 |
| 6,873,992 B1 | | 3/2005 | Thomas |
| 2002/0032694 A1 | | 3/2002 | Zawadzki et al. |
| 2002/0065831 A1 | | 5/2002 | DePaolo |
| 2002/0082862 A1 | * | 6/2002 | Kelley et al. ............ 705/2 |

(Continued)

OTHER PUBLICATIONS

"Entity Life Histories (ELH)," Date Unknown, Originally published as part of a course offering on the web site of Manchester Metropolitan University, [Retrieved on Jan. 12, 2006], Retrieved from the Internet <URL :http://www.ferg.org/papers/entity_event_modelling/>.

(Continued)

*Primary Examiner*—Jagdish N Patel
*Assistant Examiner*—Kevin Poe
(74) *Attorney, Agent, or Firm*—Osha • Liang LLP

(57) ABSTRACT

A framework is presented that can be used to create and execute software applications that include a user interview. The framework includes run-time engines and a data repository. The run-time engines include an interview driver. The data repository includes interview instructions and model information. The interview driver generates or modifies an instantiated data model by using the interview instructions and model information to obtain information from a user. The model information includes a meta-model, a data model, and an instantiated model. Once an instantiated model has been created, it can be used to generate an application-specific document, such as a tax form. A transformer and application logic are used to generate an instantiated application-specific model. The instantiated application-specific model and the document renderer are used to generate an application-specific document.

19 Claims, 16 Drawing Sheets

U.S. PATENT DOCUMENTS

| | | | |
|---|---|---|---|
| 2002/0107824 | A1 | 8/2002 | Ahmed |
| 2002/0111888 | A1 | 8/2002 | Stanley et al. |
| 2003/0030676 | A1 | 2/2003 | Iyer |
| 2003/0221162 | A1* | 11/2003 | Sridhar .................... 715/501.1 |
| 2003/0233296 | A1* | 12/2003 | Wagner ........................ 705/31 |
| 2003/0233297 | A1* | 12/2003 | Campbell .................... 705/31 |
| 2004/0003353 | A1 | 1/2004 | Rivera et al. |
| 2004/0041846 | A1 | 3/2004 | Hurley et al. |
| 2004/0083145 | A1* | 4/2004 | Kobayashi et al. ............ 705/31 |
| 2004/0148519 | A1 | 7/2004 | Graves |
| 2006/0179073 | A1* | 8/2006 | Kimura ...................... 707/102 |
| 2006/0265410 | A1* | 11/2006 | Christianson et al. ....... 707/100 |
| 2007/0150350 | A1* | 6/2007 | Libman ........................ 705/14 |

OTHER PUBLICATIONS

Yoder, Joseph et al., "The Adaptive Object-Model Architectural Style," Proceedings: The Working IEEE/IFIP Conference on Software Architecture (WICSA3), Aug. 2002, Montreal, Quebec, Canada.

Chen, Peter, "The Entity-Relationship Model—Toward a Unified View of Data," ACM Transactions on Database Systems, vol. 1, No. 1, Mar. 1976, pp. 9-36.

Dantas, Ayla et al., "Using Aspects to Make Adaptive Object-Models Adaptable," Workshop Position Paper, European Conference on Object Oriented Programming (ECOOP), Jun. 2004, Oslo, Norway.

Foote, Brian et al., "Metadata and Active Object-Models," Workshop Position Paper, Conference on Object-Oriented Programming Systems, Languages, and Applications (OOPSLA), 1998.

Object Management Group, Inc., "Unified Modeling Language (UML), Version 2.0," [Retrieved on Jan. 12, 2006], Retrieved from the Internet <URL: http://www.omg.org/technology/documents/formal/uml.htm>.

Soley, Richard et al., "Model Driven Architecture," Object Management Group, White Paper, Draft 3.2, Nov. 27, 2000, [Retrieved on Jan. 12, 2006], Retrieved from the Internet <URL: ftp://ftp.omg.org/pub/docs/omg/00-11-05.pdf>.

Burbeck, Steve, Ph.D., "Applications Programming in Smalltalk-80™: How to Use Model-View-Controller (MVC)," 1987, 1992, [Retrieved on Jan. 12, 2006], Retrieved from the Internet <URL: http://www.math.rsu.ru/smalltalk/gui/mvc.pdf>.

Deacon, John, "Model-View-Controller (MVC) Architecture," Aug. 1995, revised Aug. 2000 and Apr. 2005, [Retrieved on Jan. 12, 2006], Retrieved from the Internet <URL: http://www.jdl.co.uk/briefings/MVC.pdf>.

Object Technology International, Inc., "Eclipse Platform Technical Overview," Feb. 2003 (updated for 2.1, originally published Jul. 2001), [Retrieved on Jan. 12, 2006], Retrieved from the Internet <URL: http://www.eclipse.org/whitepapers/eclipse-overview.pdf>.

Safran, Sol, "IRS XML Initiatives," Apr. 21, 2004, [Retrieved on Jan. 12, 2006] Retrieved from the Internet <URL: http://www.xml.gov/presentations/irs1/xmlinitiatives_files/frame.htm>.

Adobe Systems, Inc., "The Adobe XML Architecture," 2006 [Retrieved on Jan. 12, 2006], Retrieved from the Internet <URL: http://www.adobe.com/enterprise/xml.html>.

Riehle, Dirk et al., "The Architecture of a UML Virtual Machine," Proceedings: Conference on Object-Oriented Programming Systems, Languages, and Applications (OOPSLA), Oct. 2001, Tampa, Florida, ACM Press, pp. 327-341.

Devos, Martine et al., A Repository-Based Framework for Evolutionary Software Development, Chapter in the book *Implementing Application Frameworks: Object-Oriented Frameworks at Work*, Mohamed Fayad et al., Eds., Wiley Computer Publishing, 1999.

Johnson, Ralph, "The Dynamic Object Model Architecture," Unpublished, Last updated Nov. 13, 1998, [Retrieved on Oct. 25, 2004] Retrieved from the Internet <URL: http://st-www.cs.uiuc.edu/users/johnson/papers/dom/DynamicObjectModel.pdf.>.

Raabe, Alar, "Feature Matching in Model-Based Software Engineering," Aug. 15, 2003, Retrieved from the Internet <URL: http://www.profitsoftware.ee/usr/alar/ar-web.nsf/bfadd62cfe71c90ec22562740039d2c0/d4b919c3ce4befe8c2256d8300580feb/$FILE/ESSCaSS2003-3-2.pdf>.

Yoder, Joseph, "A Framework to Build Financial Models," [Retrieved on Jan. 19, 2006], Retrieved from the Internet <URL:http://www.joeyoder.com/financial_framework/>.

Yoder, Joseph, "A Description of the Business Model Research," [Retrieved on Jan. 19, 2006], Retrieved from the Internet <URL:http://http://www.joeyoder.com/Research/catdesc.html >.

Financial Objects, activebank, [Retrieved on Jan. 19, 2006], Retrieved from the Internet <URL:http://www.finobj.com/solutions/banking/activebank/technology/technical_architecture.php>.

Simon, Xavier; Australian Patent Office; Examiner's first report on patent application No. 2005309461 dated Apr. 8, 2010.

\* cited by examiner

| Entity | Attributes | Derived Entities |
|---|---|---|
| Person | Name | |
| | DateOfBirth | |
| | Gender | |
| | MarriageStatus | |
| | Citizenship | |
| | SSN | |
| Business | Name | |
| | DateEstablished | |
| | Site | |
| | FederalID | |
| | StateID | |
| Residence | Address | Primary |
| | Phone | Secondary |
| Site | Address | |
| | Phone | |
| Liability | Type | Mortgage |
| | OriginalAmount | Car Loan |
| | Balance | Equity Loan |
| | Term | Personal Loan |
| | Interest | |
| Asset | Type | Real Estate (Land, House, Building) |
| | OriginalValue | Vehicle |
| | CurrentValue | Regular Financial |
| | Interest | Retirement Financial |
| | Term | |
| | Depreciation | |
| | Appreciation | |
| School | Type | |
| | Start | |
| | End | |
| | Site | |
| Charity | Type | Church |
| | Site | Non-profit Organization |
| | | Professional Association |
| | | Residential Association |
| Government | Type | Federal |
| | Site | State |
| Medical Institute | Type | Hospital |
| | Site | Medical Insurance |

FIG. 9

| Relation | Entity #1 | Entity #2 | Attributes | Events to Establish Relation | Events to End Relation | Rules |
|---|---|---|---|---|---|---|
| Spouse | Person | Person | Role | Marriage | Divorce / Death | "Husband" and "Wife" roles. "Husband" role is usually for Male Person, "Wife" role is usually for Female Person. |
| Parent/Child | Person | Person | Date Role | Birth / Adoption / Marriage | Death / Law Suit | "Parent" and "Child" roles. Usually "Parent" is older than "Child", especially when the relation is established by "Birth" or "Adoption" events. If relation is established via "Marriage" only, then "child" is step-child, in which the age inference rule may not be applicable. |
| Dependent | Person | Person | Date Related Role | Start Financial Support / Move-In | Stop Financial Support / Move-Out | "Dependee" and "Dependent" roles. "Dependee" provides financial support for "Dependent". |
| Work For | Person | Business | Job Title Salary Benefits Expenses | Hire | Laid-off / Quit / Fired / Retire / Company shutdown | "Employer" and "Employee" roles. "Employer" is a type of business. |
| Education | Person | School | Degree Start Expected Finish Tuition Expenses | Enroll | Drop / Graduate | "School" and "Student" roles. |
| Live in | Person | Residence | Start End | Move in | Move out | |
| Station | Business | Site | Start End | Relocate | Relocate | |
| Volunteer | Person | Community | Start End Donate Volunteer | Join | Leave | |
| Own | Person | Assets | | Buy / Win / Receive | Sell / Give Away / Forfeit | |
| Own | Person | Receivables | | Lend | Receive | |
| Owe | Person | Liabilities | | Borrow | Pay-Off | |
| Pay / Receive | Person | Government | Type Benefit Tax | Relocate / Naturalization | Relocate (foreign country, another state) | |

FIG. 10

| Events | Actor #1 | Object | Actor #2 | Pre-Condition | Post-Condition | Frequency | Reason |
|---|---|---|---|---|---|---|---|
| Born | Person | | Mother / Father | Non-existence | New Person Entity | 1 | |
| Die | Person | | Self | Live Person | No longer a Person Entity | 1 | |
| Marry | Person | | Person | Single | Married | 0..* | |
| Divorce | Person | | Person | Married | Single | 0..* | |
| Injure | Person | | Self | Healthy | Disabled | 0..* | |
| Start Job | Person | WorkFor | Business | No WorkFor Relation | WorkFor Relation | 0..* | |
| End Job | Person | WorkFor | Business | WorkFor Relation | No longer a WorkFor Relation | 0..* | Quit / Laid-off / Fired |
| Retire | Person | WorkFor | Business | WorkFor Relation | No longer a WorkFor Relation | 0..* | Getting Old / Financially Sound |
| Switch Job | Person | WorkFor | Business | Old WorkFor Relation | New WorkFor Relation | 0..* | Better Job |
| Promotion | Person | WorkFor | Business | Old Rank | New Rank | 0..* | Advancement |
| Relocation | Person | Location | Business | Old Location | New Location | 0..* | Development |
| Change Benefits | Person | Benefits | Business | Old Benefits | New Benefits | 0..* | |
| Get Bonus | Person | Money | Business | Current Income | More Income | 0..* | Performance Reward |
| Get Paid | Person | Money | Business | Current Income | More Income | 0..* | Compensate for Work |
| Get Raise | Person | Money | Business | Current Income | More Income | 0..* | Better Pay |
| Change Phone | Person | | Residence | Old Phone Number | New Phone Number | 0..* | |
| Change Zone | Person | | Residence | Old Zone (Zip) | New Zone (Zip) | 0..* | |
| Move / Relocate | Person | | Residence | Old Location | New Location | 0..* | Job / Personal |
| Buy | Person | Asset | Seller | Current Assets | More Assets | 0..* | |
| Sell | Person | Asset | Buyer | Current Assets | Less Assets | 0..* | |
| Transfer | Person | Asset | Acct To Acct | Current Assets | Same Level | 0..* | |
| Earn Interests | Person | Asset | Bank / Borrower | Current Assets | More Assets | 0..* | |
| Earn Dividends | Person | Asset | Issuer | Current Assets | More Assets | 0..* | |
| Exchange | Person | Asset | Trader | Current Assets | Same Level / More / Less | 0..* | |
| Destroy | Person | Asset | Self | Current Assets | Less Assets | 0..* | |
| Theft | Person | Asset | Theif | Current Assets | Less Assets | 0..* | |
| Default | Person | Asset | Lender | Current Assets | Less Assets | 0..* | |
| Win | Person | Asset | Sponsor | Current Assets | More Assets | 0..* | Gamble, Lottery, Promotion |
| Receive | Person | Asset | Giver | Current Assets | More Assets | 0..* | Inherit / Beneficiary |
| Give | Person | Asset | Receiver | Current Assets | Less Assets | 0..* | |
| Refinance | Person | Liability | Lender | Current Interest Rate | Reduced Interest Rate | 0..* | |
| Paid Off | Person | Liability | Lender | Current Liabilities | Less Liabilities | 0..* | |
| Consolidate | Person | Liability | Bank | Current Liabilities | Same Level / Reduced | 0..* | |
| Default | Person | Liability | Lender | Current Liabilities | Less Liabilities | 0..* | |
| Payment | Person | Liability | Lender | Current Liabilities | Less Liabilities | 0..* | |
| Join | Person | | Community | Non-member | Member | 0..* | |
| Leave | Person | | Community | Member | Non-Member | 0..* | |
| Contribute | Person | Asset | Community | Current Donation | More Donation | 0..* | |
| Volunteer | Person | | Community | Current Volunteering Time | More Volunteering Time | 0..* | |
| Enroll | Person | Degree | School | Out of School | In School | 0..* | |
| Drop | Person | Degree | School | In School | Out of School | 0..* | |
| Graduate | Person | Degree | School | In School | Out of School | 0..* | |

FIG. 12

USING AN INSTANTIATED MODEL TO GENERATE AN APPLICATION-SPECIFIC DOCUMENT

This patent application is a continuation of U.S. patent application Ser. No. 11/285,930, filed on Nov. 23, 2005, now abandoned entitled "Model-Driven User Interview" which claims priority from U.S. Provisional Patent Application Ser. No. 60/630,812, filed on Nov. 23, 2004, entitled "Model-Driven Tax Application Framework", both of which are incorporated herein by reference. This application is related to the following patent applications, which are hereby incorporated by reference: U.S. patent application Ser. No. 11/534,532, filed on Sep. 22, 2006, entitled "Flow Control Information for a Model-Driven User Interview"; U.S. patent application Ser. No. 11/534,540, filed on Sep. 22, 2006, entitled "Prompts for a Model-Driven User Interview"; and U.S. patent application Ser. No. 11/534,544, filed on Sep. 22, 2006, entitled "User Interface for a Model-Driven User Interview".

BACKGROUND

The present invention relates to software that includes a user interview.

Filling out forms is a common activity in modern times. Some forms are simple and straightforward, while others are complex and difficult to understand. Over the years, software has been created to help people fill out forms. One type of software obtains, from a user, information that is needed to fill out a form. For example, software can "interview" a user by prompting the user to enter information. This information can then be processed in order to determine how the form should be filled out. Such software has been created to assist with completion of forms used in fields such as finance and law.

SUMMARY

A framework is presented that can be used to create and execute software that includes a user interview. In one embodiment, the software is financial in nature and can be used, e.g., for tax, accounting, or financial management. The interview collects information that can be used, for example, to fill out a form or generate a document. The interview is dynamic, in that it can vary from user to user and from one moment to the next, depending on information that has been gathered so far.

The framework includes various run-time engines and a data repository. Together, the run-time engines execute a software application, which includes a user interview, based on the contents of the data repository.

The data repository includes model information and interview instructions. The model is configured to store any type of information that has financial implications, such as personal information (e.g., date of birth, marital status), employment information (e.g., salary, benefits), account balances for any type of financial account, and financial transactions. In one embodiment, the model information includes a meta-model, a data model, and an instantiated model. The meta-model defines four types of elements: entities (persons, places, or things), relations (associations between entities), rules (restrictions placed on entities or relations), and events (change state of entities and relationships). The data model includes specialized versions of these elements, such as specialized entities (e.g., a person or business), specialized relations (e.g., marriage or employment), specialized rules (e.g., regarding whether a person can legally work), and specialized events (e.g., marriage or starting a job).

The meta-model and the data model are abstract, in that they do not include data specific to a particular entity (e.g., a user). For a given financial application, an instantiated data model is created from the data model, which includes one or more instantiated elements (elements that have a value for one or more attributes). An instantiated element represents a "real-life" phenomenon, although the phenomenon can be real or hypothetical.

The interview instructions specify how to obtain information from a user to create or modify the instantiated data model. In one embodiment, the interview instructions include flow control information, prompts, and user interface (UI) information. The flow control information controls the flow of an interview. In one embodiment, the flow is based on the data model. If a specialized entity is viewed as a node and a specialized relation is viewed as an edge, a set of interconnected entities and relations can be interpreted as a graph. In one embodiment, the interview flow corresponds to how this graph is traversed, from node to edge and vice versa.

The prompts include prompts (e.g., questions) to present to a user during the interview process. A prompt elicits information that can be used to discover or explore a data model element, such as a specialized entity or relation. In one embodiment, each element in the data model has three types of prompts associated with it: AskExist, AskDetail, and AskChange.

The UI information specifies the user interface for the application. In one embodiment, the UI information specifies how a prompt is presented and/or how a user responds to a prompt. In one embodiment, each element in the data model has one or more associated UIs, which the user uses to input requested information.

The run-time engines include an interview driver. The interview driver executes an application, which includes a user interview, based on the contents of the data repository. The interview driver generates or modifies an instantiated model by using the interview instructions to obtain information from a user. Specifically, the interview driver executes an interview sequence based on the instantiated model and the flow control information. The interview driver uses the prompts and the UI information to present a prompt to and receive input from the user. The interview driver uses the input information to create or modify the instantiated model (e.g., by creating a new element or by modifying or removing an existing element).

Once an instantiated model has been created, it can be used to generate an instantiated application-specific model, such as for personal income tax. The instantiated application-specific model can then be used to generate an application-specific document, such as a tax form. Since the application is executed based on the contents of the repository, the application can be modified by changing the contents of the repository.

BRIEF DESCRIPTION OF THE DRAWINGS

FIG. 9 illustrates a table of specialized entities and their characteristics, according to one embodiment of the invention.

FIG. 10 illustrates a table of specialized relations and their characteristics, according to one embodiment of the invention.

FIG. 12 illustrates a table of specialized events and their characteristics, according to one embodiment of the invention.

One skilled in the art will readily recognize from the following discussion that alternative embodiments of the structures and methods illustrated herein may be employed without departing from the principles of the invention described herein.

DETAILED DESCRIPTION

The embodiments described below address financial software that "interviews" a user (i.e., prompts a user for information). However, the invention can be used in conjunction with any type of software that includes a user interview. This software can be used in such diverse fields as, for example, law (e.g., court documents) and legal compliance (e.g., local, state, and federal government filings).

In addition, while the invention can be used in conjunction with any type of financial software (e.g., tax, accounting, and financial management), the embodiments described below address tax software in particular. Specifically, systems and methods for tax software that includes a user interview are described.

Framework to Create Software that Includes a User Interview

According to one embodiment of the invention, a framework is used to create and execute software that includes a user interview. The interview collects information that can be used, for example, to fill out a form or generate a document. The interview is dynamic, in that it can vary from user to user and from one moment to the next, depending on information that has been gathered so far.

One variable aspect of the interview is its "flow" (sequence or logic), which represents which information is sought and in what order. Another variable aspect of the interview is how the user is prompted for information (e.g., which questions are asked).

Figure 1:
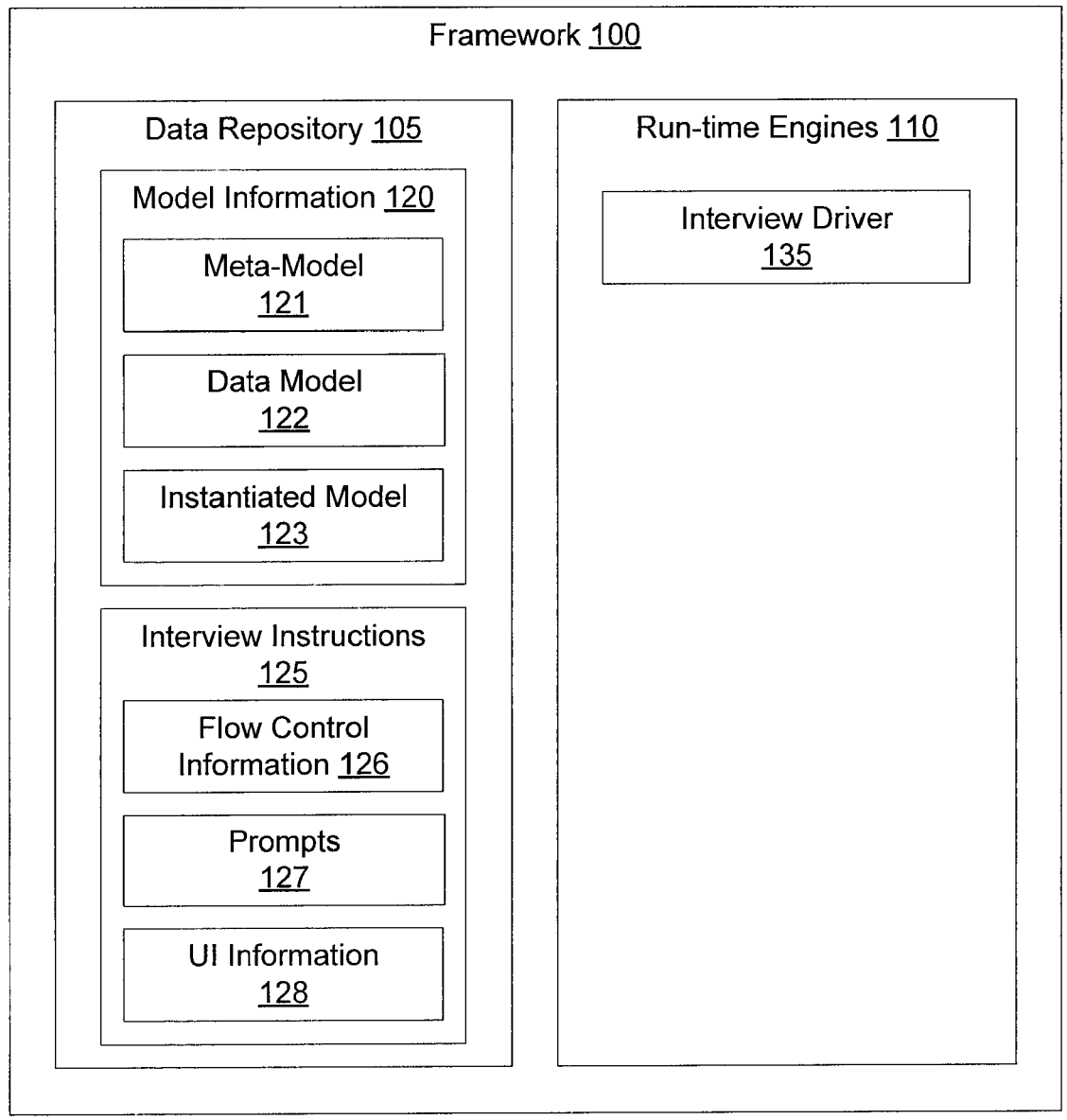
FIG. 1 illustrates a block diagram of a framework that can be used to create and execute software that includes a user interview, according to one embodiment of the invention.

FIG. 1 illustrates a block diagram of a framework that can be used to create and execute software that includes a user interview, according to one embodiment of the invention. Here, the framework 100 includes a data repository 105 and run-time engines 110. The data repository 105 includes model information 120 and interview instructions 125.

The model information 120 includes a meta-model 121, a data model 122, and an instantiated model 123. The meta-model 121 includes four types of elements (entities, relations, rules, and events) that can store information with financial implications. An entity represents a person, place, or thing; a relation represents an association between entities; a rule represents a restriction placed on an entity or relation; and an event signals a change in an element. The data model 122 includes specialized versions of these elements, where each specialized element has various attributes, each of which can be assigned a particular value. The instantiated model 123 includes one or more instantiations of the elements in the data model 122, where an instantiation is an element that contains a value for one or more of its attributes. In one embodiment, the model information 120, including the meta-model 121, data model 122, and instantiated model 123, is expressed using eXtensible Markup Language (XML). The model information 120 is further described below in the section entitled "Example: Financial Software," according to one embodiment of the invention.

The interview instructions 125 specify how to obtain information from a user. In one embodiment, the interview instructions 125 include flow control information 126, prompts 127, and user interface (UI) information 128.

The flow control information 126 controls the flow of an interview. In one embodiment, the flow is based on the data model 122. If a (specialized) entity is viewed as a node and a (specialized) relation is viewed as an edge, a set of interconnected entities and relations can be interpreted as a graph. In one embodiment, the flow corresponds to how this graph is traversed, from node to edge and vice versa.

The interview process can include, for example, two phases for each specialized element in the graph. The first phase, discovery, comprises determining whether the element exists. The second phase, exploration, comprises determining information about the element. Each of these determinations can be made based on, for example, information received from a user or information inferred from other information, as explained below.

In one embodiment, the flow control information 126 specifies the order in which specialized elements should be discovered and/or explored. In one embodiment, the order of discovery and/or exploration can be controlled in three different ways. A first way is via a pre-defined sequence. One example of a pre-defined sequence is to start at the main Person entity, then discover his Residence entity (if any), then his Spouse relation (if any), then his WorkFor relation (if any), etc. Another example of a pre-defined sequence is to start at the main Person entity, then discover his WorkFor relation, then the associated Business entity, etc.

A second way to control the flow is via a set of rules or heuristics. One example of a heuristic is to discover a Spouse relation before discovering a WorkFor relation. Another example of a heuristic is to discover an entity before a relation. Yet another example is to discover all of the relations connected to a particular entity before exploring any of the relations in depth. A heuristic can be thought of as a partial ordering of the elements of a data model. For example, a heuristic that specifies an ordering between entities does not address ordering between relations or between a relation and an entity.

In one embodiment, data model elements are organized into groups, and a heuristic orders elements based on their groups. For example, the "Personal Information" group includes Person entities, Business entities, and Residence entities. The "Things You Own" group includes entities derived from the Asset entity, such as Building Asset entities and Vehicle Asset entities. The "Things You Owe" group includes entities derived from the Liability entity, such as Mortgage Liability entities and Equity Loan Liability entities. The "Others" group includes the remaining entities of the data model.

Possible heuristics can include, for example: discovering "Personal Information" entities before "Things You Own" entities; discovering "Personal Information" entities before "Things You Owe" entities; discovering "Things You Own" entities before "Others" entities; and discovering "Things You Owe" entities before "Others" entities. These four heuristics act as a partial ordering of all entities in the data model. (The ordering is not complete because no heuristic addresses both "Things You Own" entities and "Things You Owe" entities.) While the above heuristics address discovery, a heuristic can also be used for exploration (e.g., to determine whether an element should be explored immediately or deferred until later).

In one embodiment, the flow control information 126 specifies whether a specialized element that has been discovered is explored immediately or is deferred until later. For example, an application traverses an instantiated model 123 graph and discovers an element, such as a specialized entity or relation. The application can explore (determine information about) the element either immediately or at a later time. For example, one type of flow discovers all of the relations connected to a particular entity before exploring any of the relations in depth. In this embodiment, exploration of a relation is deferred until all of the relations (connected to a particular entity) have been discovered.

For example, more generally, an application traverses an instantiated model 123 graph and encounters an element, such as an entity (node) or a relation (edge). The application checks which elements (if any) it has discovered but not explored. If a heuristic exists that gives higher priority to a previously-discovered but as-yet unexplored element (e.g., based on their groups), then exploration of the current element is deferred.

A third way to control the flow is via a generic graph-search algorithm, such as depth-first, breadth-first, branch-and-bound, beam, or random. One example of a breadth-first algorithm is to start at the main Person entity and then discover all of his connected relations before discovering any entities associated with the relations. (Discovering an entity associated with a relation before having discovered all relations would be an example of searching the depth of the graph.)

Note that since the pre-defined sequence discusses particular specialized elements, its operation is limited to an application using a particular data model 122. Since a generic graph-search algorithm operates independently of the data model 122, it can be used to control the flow of any application that uses any data model 122. Also, note that the above methods of flow control can be used in combination. For example, a discovery decision can be made based on a heuristic. However, if no heuristic applies to the particular situation, a pre-defined sequence or generic graph-search algorithm can be used instead.

In another embodiment, the flow control information 126 includes which type of prompt should be presented at each node (entity) or edge (relation) as it is being traversed (e.g., discovered or explored). In one embodiment, each element in the data model 122 has three types of prompts associated with it. The first type ("AskExist") elicits information that can be used to "discover" the specialized element (i.e., determine whether the specialized element exists). The second type ("AskDetail") elicits information that can be used to "explore" the specialized element (e.g., instantiate it by assigning a value to one or more of its attributes). The third type ("AskChange") elicits information regarding a possible change in the specialized element. Since an event can change a specialized element, an AskChange prompt sometimes elicits information that can be used to discover or explore a specialized event.

Consider a Spouse relation, which associates two Person entities. An AskExist prompt could be "Are you married?" or "Are you single?". An AskDetail prompt could be "Tell us more about your marriage" or "Describe your wedding." An AskChange prompt could be "Has there been any change in your marital status since Jan. 1, 2005?" or "Did you get married in 2005?".

In one embodiment, for an existing entity or relation, one of two prompts could be presented: 1) an AskChange prompt about the entity or relation or 2) an AskExist prompt about a specialized event that would change (or remove) that entity or relation. For a non-existing entity or relation, one of two prompts could be presented: 1) an AskExist prompt about the entity or relation or 2) an AskExist prompt about a specialized event that would create that entity or relation.

At run-time, the interview driver 135 can access the flow control information 126 to determine, for example, which element to discover or explore next and/or which type of prompt to present. The flow control information 126 can differ based on what type of flow is desired. For example, if a pre-defined sequence is desired, the flow control information 126 can include a specific ordering of data model elements, such as entities and relations. If a rule- or heuristic-based flow is desired, the flow control information 126 can include one or more rules or heuristics and their rankings in terms of which should be applied in case of a conflict. If a graph-search algorithm is desired, the flow control information 126 can include one or more algorithms, such as breadth-first search, depth-first search, branch-and-bound, and beam search.

In one embodiment, the flow control information 126 is stored in a database using XML. Appendix A includes XML code for defining discovery or exploration heuristics based on groups (as described above), according to one embodiment of the invention.

The prompts 127 include prompts (e.g., questions) to present to a user during the interview process. As discussed above, a prompt elicits information that can be used to discover or explore a data model 122 element (such as a specialized entity or relation).

In one embodiment, each element in the data model 122 has three types of prompts associated with it: AskExist prompts, AskDetail prompts, and AskChange prompts. In one embodiment, if more than one prompt exists for a particular type (e.g., if two AskExist prompts exist), a prompt is chosen at run-time based on one or more user characteristics. These characteristics could be described in the instantiated model 123 by various specialized elements. For example, the user's age and gender could be described by the Person entity that represents the user. The characteristics would then be used to determine the appropriate prompt. For example, if the user is under the age of 25, the chosen AskExist prompt might be "Are you single?", rather than "Are you married?".

Information related to the specialized element in question (i.e., the element about which information is being elicited)

could also be described by another specialized element. AskChange prompts, in particular, can make good use of this type of information. Since an AskChange prompt elicits information regarding a possible change in the specialized element, an initial state of the specialized element is implied. For example, if the specialized element in question is the Spouse relation and the instantiated model 123 currently describes the user as single, the chosen AskChange prompt might be "Did you get married in 2005?", rather than "Has there been any change in your marital status since Jan. 1, 2005?".

User characteristics could also include information beyond that which is described in the instantiated model 123. For example, user characteristics could include the user's level of experience with the application (e.g., whether the user is an expert or a novice). The level of experience could be based on statistics gathered by the software during use of the application.

In one embodiment, a prompt is written individually. In another embodiment, a prompt is generated using software. For example, a "template" prompt can be used that designates certain variables whose values are determined at run-time. One example of a template prompt is "What is your <spousetitle>'s name?" where the value of the variable <spousetitle> can be "wife" or "husband," depending on the user's gender. Thus, this one template prompt can be written instead of the two "normal" prompts "What is your wife's name?" and "What is your husband's name?". As another example, natural language processing can be used to generate a prompt (e.g., based on name substitution, role substitution, and rephrasing).

In one embodiment, a prompt (whether it is a normal prompt or a template prompt) is stored in a database using XML. Appendix B includes XML code for a template prompt, according to one embodiment of the invention. At run-time, the interview driver 135 can access this information to determine which prompt to present to the user. In another embodiment, the prompt is associated with 1) the data model 122 element about which it elicits information and/or 2) the prompt's type (e.g., AskExist, AskDetail, or AskChange).

The UI information 128 specifies the user interface for the application. In one embodiment, the UI information 128 specifies how a prompt is presented and/or how a user responds to a prompt. In one embodiment, each specialized entity, relation, and event has one or more associated UIs, which the user uses to input requested information. For example, one specialized element can have different UIs that serve different purposes. An Add View UI can enable a user to create a new element by entering new information. An Edit View UI can enable a user to edit an existing element by modifying or updating existing information. A Summary View UI can present selected information about the element, while a Detail View UI can present all information about the element.

UIs can differ in appearance (for example, by using different layouts, fonts, and color schemes) based on their associated specialized element and/or their use (e.g., Add View, Edit View, Summary View, and Detail View). In one embodiment, a set of UI information 128 for a data model 122 is referred to as a "theme." By specifying a different theme, the UI of the application can be changed. In one embodiment, a UI includes a dialog box with fields into which information can be entered.

In one embodiment, the UI information 128 is stored in a database using XML. At run-time, the interview driver 135 can access this information to determine 1) how to present prompts and/or 2) how to accept input. For example, the UI information 128 can be expressed using XML User Interface Language (XUL) or eXtensible Application Markup Language (XAML). XUL is further described at http://www-.mozilla.org/projects/xul/, and its specification is available at http://www.mozilla.org/projects/xul/xul.html. XAML is further described at http://winfx.msdn.microsoft.com/library/default.asp?url=/library/en-us/wcp_conceptual/html/a80db4cd-dd0f-479f-a45f-3740017c22e4.asp.

The run-time engines 110 include an interview driver 135. The interview driver 135 executes an application (that includes a user interview) based on the contents of the data repository 105. In one embodiment (not shown), the run-time engines 110 also include helper applications such as a rule engine and a database engine. The rule engine performs rule chaining based on a rule set. Rule chaining can be used, for example, to infer information, rather than having to obtain it from the user during the interview process. It can also be used to control traversal of an instantiated model 123 graph, as explained above. In one embodiment, the rule engine is the open source Drools rule engine (available at http://drools.codehaus.org), and flow control information 126 includes rules that are input into the rule engine. The database engine interfaces with the data repository 105 to access and store information.

The interview driver 135 generates or modifies an instantiated model 123. An application, regardless of its type, will focus on collecting information relevant to one or more specialized entities. In one embodiment, when the application begins, an instantiated model 123 is generated that comprises that entity (the "anchor" entity). The interview driver 135 instantiates this entity and "discovers" (determines the existence of) other specialized elements and instantiates them. Eventually, a complete instantiated model 123 is built.

For example, consider a tax preparation application that is being used to determine the tax liability for a person. The application would generate an instantiated model 123 that included one anchor element—a Person entity that represented the taxpayer in question. The interview driver 135 would instantiate the Person entity and discover other data model elements that affect the taxpayer's tax liability.

Note that the above steps can be performed in different orders. For example, an interview driver 135 could first instantiate the taxpayer entity and then discover other elements or vice versa. Also, the interview driver 135 could instantiate one of these other elements as soon as it has been identified, or the interview driver 135 could continue identifying additional elements before instantiating any of them. These choices control the run-time operation of the interview driver 135 and were discussed above with reference to the interview instructions 125.

In one embodiment, a data model element is discovered and/or instantiated based on information received from the user of the application. For example, the application can "interview" (present prompts to) the user. In order to assign a value to a Person entity's DateOfBirth attribute, an application might ask the user for his birth date. In order to determine whether a WorkFor relation exists, an application might ask the user whether he has a job. In one embodiment, a prompt is presented visually (e.g., using a display device). In another embodiment, a prompt is presented in audio (e.g., using a speaker).

The user's response would then be used to determine the existence of an element or assign a value to an element's attribute. In one embodiment, a response is entered by using a pointing device or keyboard (e.g., to enter a value into a field of a form). In another embodiment, a response is entered by speaking (e.g., using a microphone and a voice recognition program).

In another embodiment, a data model element is discovered and/or instantiated based on information that has been inferred by the application (e.g., using a rule/inference engine). For example, consider a data model that includes a Person entity that has a Gender attribute value of "Male." The application then determines that the person represented by the Person entity is married (and thus is part of a Spouse relation). As a result of this determination, the application can infer that 1) another Person entity exists (the first person's spouse) and 2) the value of that Person entity's Gender attribute is "Female." The application can infer these facts because 1) a Spouse relation is defined as existing between two Person entities, and 2) a rule exists that states that in a Spouse relation, the two Person entities must have different values of their Gender attributes. In this way, an interview driver 135 can discover data model elements and/or instantiate them without requiring additional input from the user. Inferencing is discussed below with reference to rules associated with elements of the data model 122.

The interview driver 135 uses the interview instructions 125 to obtain information from a user. Specifically, the interview driver 135 executes an interview sequence based on the instantiated model 123 and the flow control information 126. The interview driver 135 uses the prompts 126 and the UI information 128 to present a prompt to and receive input from the user. The interview driver 135 uses the input information to create or modify the instantiated model 123 (e.g., by creating a new element or by modifying or removing an existing element).

Generating and Revising an Instantiated Model

Figure 2:
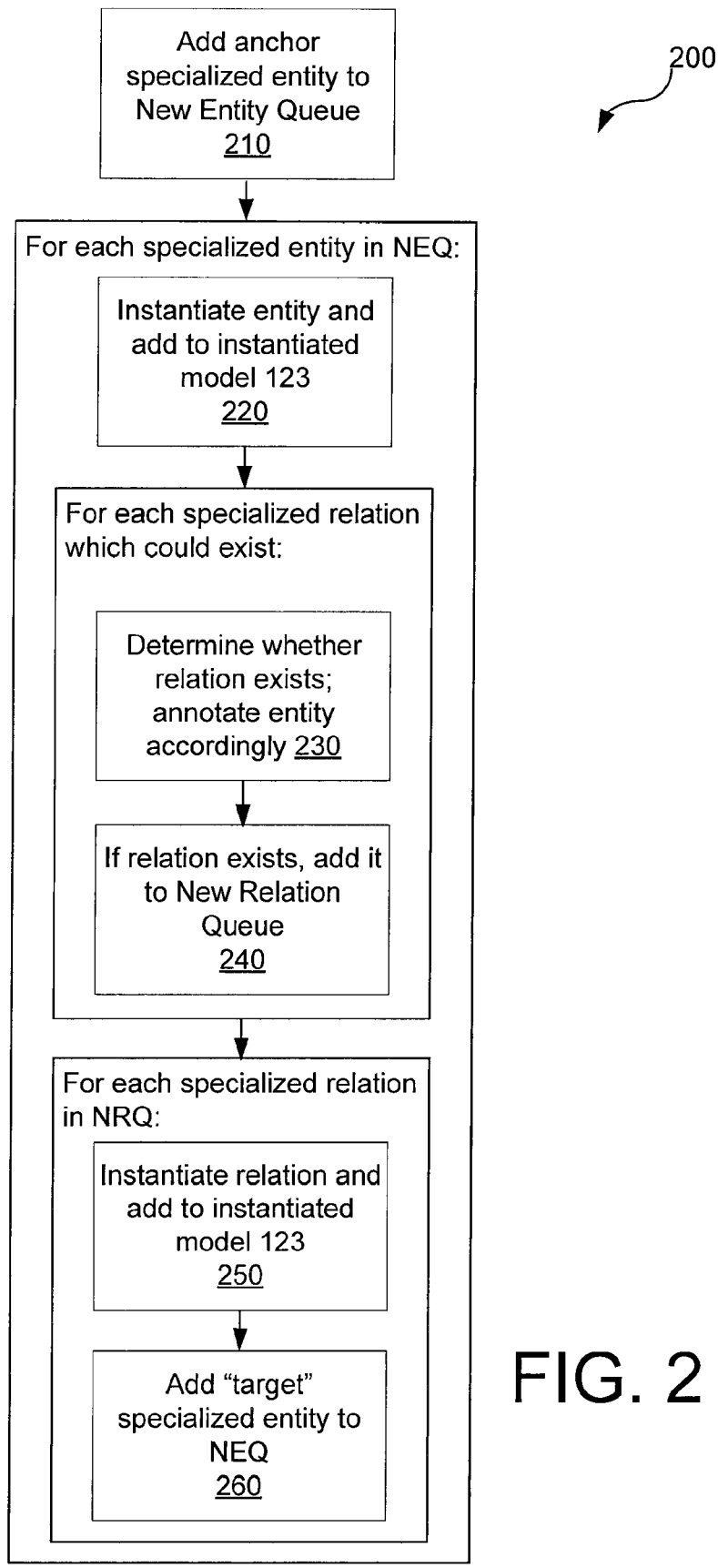
FIG. 2 illustrates a flowchart of a method for generating an instantiated model, according to one embodiment of the invention.

Software created according to the framework 100 shown in FIG. 1 can be used to generate an instantiated model 123 and/or revise an existing instantiated model 123. Generating a model is useful when, for example, the software is being used for the first time for a particular person. Revising a model is useful when, for example, the software has already been used for a particular person, but the information stored in the model is no longer current. FIG. 2 addresses generating a model, while FIGS. 3A and 3B address revising an existing model.

FIG. 2 illustrates a flowchart of a method for generating an instantiated model, according to one embodiment of the invention. In one embodiment, the interview driver 135 performs the steps of the flowchart 200. Recall that an application collects information relevant to one or more specialized entities, called "anchor" entities. An anchor entity can be, for example, a Person entity or a Business entity. In one embodiment, when the data model 122 is created, one or more entities is designated as an anchor entity.

In the embodiment illustrated in FIG. 2, there is only one anchor entity. The flowchart 200 begins when the anchor entity (a specialized entity) is added to a queue called the New Entity Queue (NEQ) 210. Next, various steps are performed for each entity (the "current entity") in the New Entity Queue. Initially, the New Entity Queue contains only the anchor entity. However, other entities can be added to the New Entity Queue in other steps of the flowchart 200, as explained below.

The current entity is instantiated and added to an instantiated model 220. (The instantiated model 123 is empty initially, until the instantiated anchor entity is added to it during the first iteration of step 220.) As discussed above, instantiating a specialized element comprises assigning a value to one or more attributes of the element. This value can be determined based on information received from the user or information inferred from other information, as discussed above. This determination is similar to the "exploration" phase described above. In one embodiment, when determining a value, inference is attempted first, based on information that has already been collected (e.g., information stored in the instantiated model 123).

If the value cannot be determined through inference, then information is sought from the user. In one embodiment, the user is presented with one or more prompts. In one embodiment, an "AskDetail" prompt that is associated with the current entity (part of the prompts 127) is presented. For example, for a Person entity, the prompt contains the question "What is your birthdate?". In response to the prompt, the user enters information, which is used to determine a value for an attribute of the entity. In one embodiment, the information is entered using an Add View UI. This process is repeated for all attributes of the entity.

Next, various steps are performed for each specialized relation (the "current possible relation") which could exist and involve the current entity. For example, if the entity is a Person entity, it could be involved in a Spouse relation, a Parent/Child relation, and/or a WorkFor relation. These relations can be identified based on the data model 122. Note that some relations involve two specialized entities of the same type (e.g., two Person entities). In one embodiment, in order to avoid considering each of these relations twice (once where the current entity is the first entity and again where the current entity is the second entity), the relations that are considered are only those where the current entity is the first ("source") entity, not where the current entity is the second ("target") entity.

A determination is made regarding whether the current possible relation exists involving the current entity, and the current entity is annotated with the answer 230. This determination is similar to the "discovery" phase described above. In one embodiment, three answers are possible: 1) exists (the current possible relation does exist), 2) doesn't exist (the current possible relation does not exist), and 3) unknown (it is unclear whether the current possible relation exists). If the current possible relation does exist, it is added to a queue called the New Relation Queue (NRQ) 240.

The determination can be based on information received from the user or information inferred from other information. In one embodiment, when making this determination, inference is attempted first based on information that has already been collected (e.g., information stored in the instantiated model 123).

If the determination cannot be made through inference, then information is sought from the user. In one embodiment, the user is presented with one or more prompts. In one embodiment, an "AskExist" prompt that is associated with the current possible relation (part of the prompts 127) is presented. For example, for a Spouse relation, the prompt contains the question "Are you married?". In another embodiment, an "AskExist" prompt that is associated with an event (part of the prompts 127) is presented. This event could be one that, if it occurred, would create the current possible relation. For example, for a Spouse relation, the event could be a wedding, and the prompt could contain the question "Did you get married recently?". In response to the prompt, the user enters information, which is used to determine whether the current possible relation exists involving the current entity.

Next, various steps are performed for each specialized relation (the "current actual relation") in the New Relation Queue. Initially, the New Relation Queue contains only relations involving the anchor entity. However, other relations can be added to the New Relation Queue in other steps of the flowchart 200, as explained below.

The current actual relation is instantiated and added to the instantiated model 250. A value of an attribute of a specialized relation can be determined based on information received from the user or information inferred from other information. This determination is similar to the "exploration" phase described above. In one embodiment, when determining a value, inference is attempted first, based on information that has already been collected (e.g., information stored in the instantiated model 123).

If the value cannot be determined through inference, then information is sought from the user. In one embodiment, the user is presented with one or more prompts. In one embodiment, an "AskDetail" prompt that is associated with the current actual relation (part of the prompts 127) is presented. For example, for a Spouse relation, the prompt contains the question "When did you get married?". In response to the prompt, the user enters information, which is used to determine a value for an attribute of the current actual relation. In one embodiment, the information is entered using an Add View UI. This process is repeated for all attributes of the relation.

Recall that a relation involves multiple entities. Since a determination has been made that the relation exists, the other entities in the relation (e.g., those other than the current entity) must also exist. These other (specialized) entities are added to the New Entity Queue 260 and will be processed accordingly, as described above. In one embodiment, steps 250 and 260 can be performed in either order.

Note that the above description of the flowchart 200 does not address the order in which 1) the specialized entities in the New Entity Queue are explored (e.g., starting with step 220), 2) the specialized relations are discovered (e.g., starting with step 230), and 3) the specialized relations in the New Relation Queue are explored (e.g., starting with step 250). These orders are based on the flow control information 126 described above. For example, regarding entities, the flow control information 126 can specify that Person entities should be explored before Business entities. Regarding relations, the flow control information 126 can specify that Spouse relations should be discovered before WorkFor relations but that Spouse relations should be explored after WorkFor relations.

Other embodiments of the flowchart 200 are also possible, based on the flow control information 126. For example, the iteration loops for exploring entities, discovering relations, and exploring relations can be defined differently, therefore affecting the flow of the interview. In one embodiment (not shown), once a determination has been made that a current possible relation does exist (step 230), that relation is explored immediately (steps 250 and 260), rather than waiting for determinations to be made regarding the existence of other possible relations. In this embodiment, each possible relation is processed for both discovery and exploration (if the relation exists) before another relation is considered.

In another embodiment (not shown), once a target entity has been added to the New Entity Queue (step 260), that entity is explored immediately (step 220), rather than waiting for exploration of other actual relations (steps 250 and 260). In this embodiment, each entity is explored as soon as it is discovered.

Figure 3A:
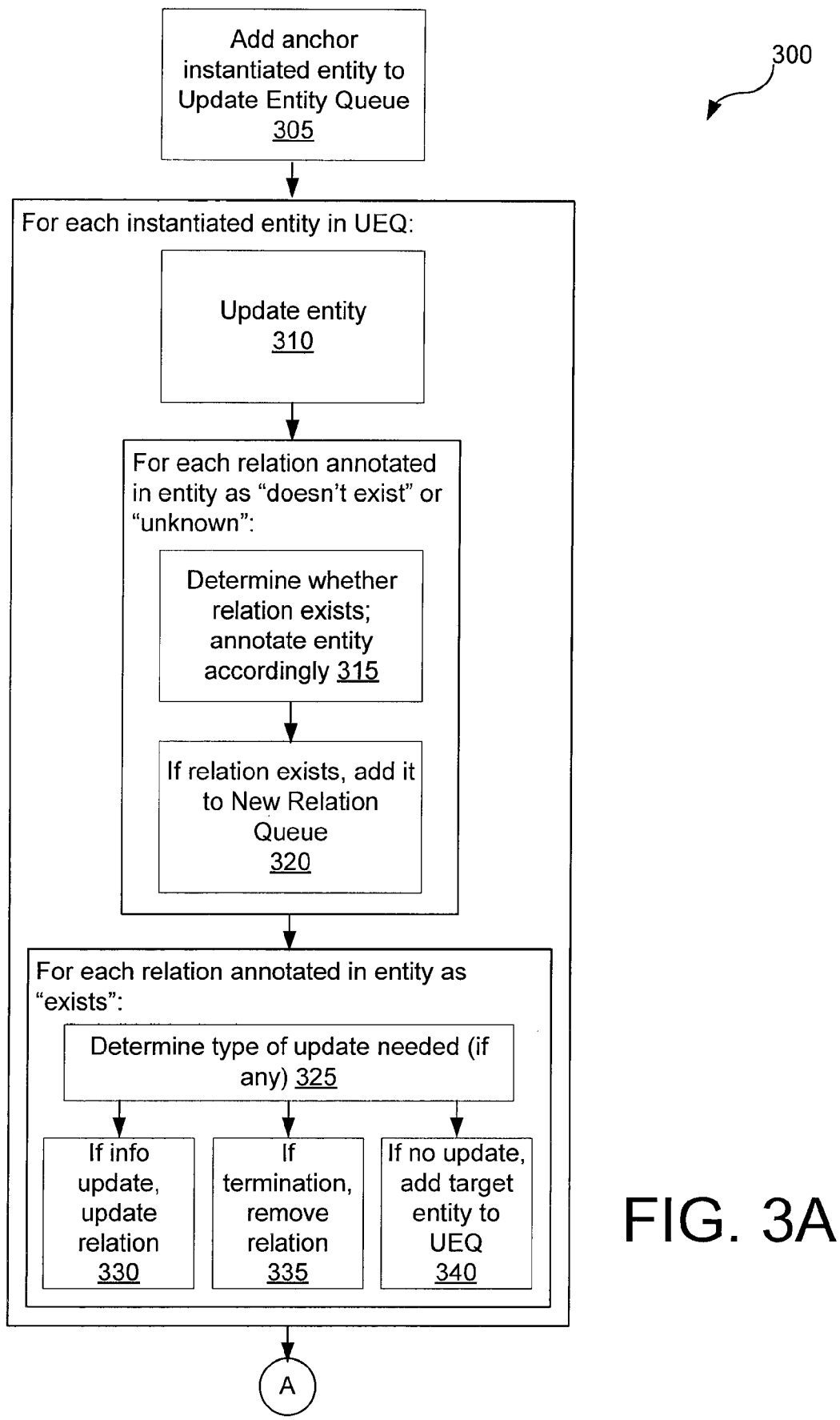
FIGS. 3A and 3B illustrate a flowchart of a method for revising an instantiated model, according to one embodiment of the invention.
Figure 3B:
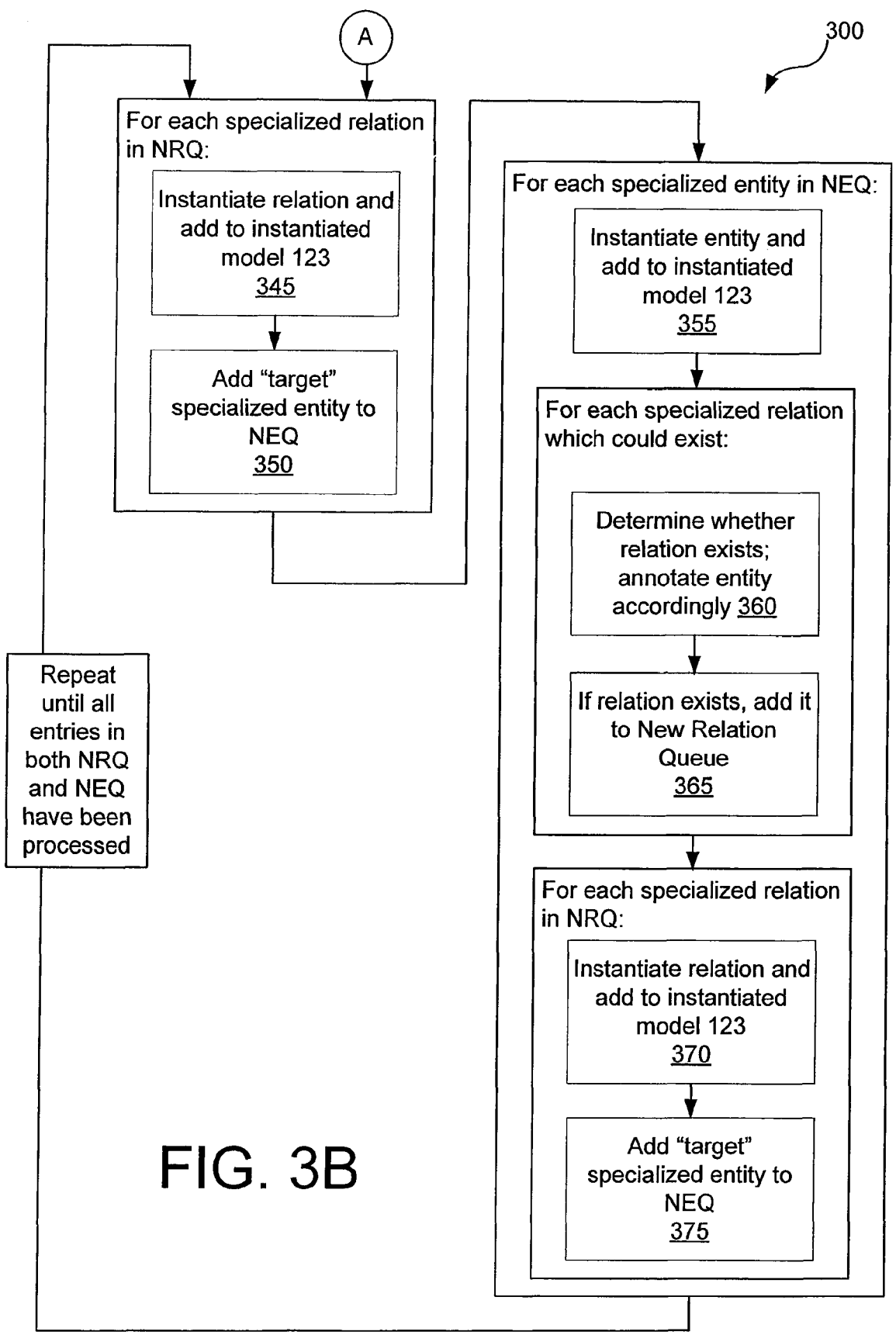

FIGS. 3A-3B illustrate a flowchart of a method for revising an instantiated model, according to one embodiment of the invention. In one embodiment, the interview driver 135 performs the steps of the flowchart 300. When the flowchart 300 begins, an instantiated model 123 already exists.

In the embodiment illustrated in FIGS. 3A and 3B, the instantiated model 123 includes only one anchor entity. The flowchart 300 begins when the anchor entity (an instantiated specialized entity) is added to a queue called the Update Entity Queue (UEQ) 305.

Next, various steps are performed for each instantiated entity (the "current entity") in the Update Entity Queue. Initially, the Update Entity Queue contains only the anchor entity. However, other entities can be added to the Update Entity Queue in other steps of the flowchart 300, as explained below.

The current entity is updated 310. In one embodiment, updating an entity 310 comprises updating the value (if necessary) of one of the entity's attributes. In one embodiment, when determining the updated value, inference is attempted first, based on information that has already been collected (e.g., information stored in the instantiated model 123). If the updated value cannot be determined through inference, then information is sought from the user by presenting one or more prompts. In one embodiment, an "AskChange" prompt that is associated with the current entity (part of the prompts 127) is presented. For example, for a Person entity, the prompt contains the question "Have you changed your name?". In another embodiment, an "AskExist" prompt that is associated with an event (part of the prompts 127) is presented. This event could be one that, if it occurred, could change an attribute of the current entity. For example, for a Person entity, the event could be a wedding (causing the "name" attribute to change), and the prompt could contain the question "Did you get married recently?". In response to the prompt, the user enters information, which is used to update an attribute value of the current entity. In one embodiment, the information is entered using an Edit View UI. This process can be repeated for multiple AskChange prompts, AskExist prompts, and attributes of the entity.

In the embodiment just described, only one version of each instantiated entity exists at a time (e.g., in the data repository 105). In another embodiment, multiple versions of the same instantiated entity can exist simultaneously. These versions can represent the instantiated entity during various time periods. In one embodiment, an element includes "begin" and "end" attributes that represent the start date and end date, respectively, between which the phenomenon modeled by the entity exists. The entity also includes a "past" attribute, which references the corresponding entity (if any) that existed before the begin date, and a "future" attribute, which references the corresponding entity (if any) that existed after the end date. In this way, an entity is "linked" to other versions of itself.

In one embodiment, where multiple versions of the same instantiated entity can exist simultaneously, updating an entity 310 comprises the following: A determination is made regarding whether a value of one of the entity's attributes should be changed. If the value should be changed, the entity is copied. The non-copy entity is then updated with a new value for the attribute. The copy represents the entity before the change, while the non-copy represents the entity after the change. The values of the "end" attribute of the copy and the "begin" attribute of the non-copy are set to a timestamp that reflects their periods of validity. In addition, the "future" attribute of the copy references the non-copy, while the "past" attribute of the non-copy references the copy.

Next, various steps are performed for each specialized relation annotated in the current entity (the "current relation"). Recall that when the instantiated model 123 was generated (FIG. 2), possible relations were considered, and the entity was annotated with their states of existence (step 230).

For each relation annotated as "doesn't exist" or "unknown", a determination is made regarding whether the relation exists (involving the current entity), and the current entity is annotated with the answer 315. If the current relation does exist, it is added to a queue called the New Relation Queue (NRQ) 320.

In one embodiment, in order to make this determination, inference is attempted first, based on information that has already been collected (e.g., information stored in the instantiated model 123). If the determination cannot be made through inference, then information is sought from the user by presenting one or more prompts. In one embodiment, an "AskExist" prompt that is associated with the current relation (part of the prompts 127) is presented. For example, for a Spouse relation, the prompt contains the question "Are you married?". In another embodiment, an "AskExist" prompt that is associated with an event (part of the prompts 127) is presented. This event could be one that, if it occurred, could create the current relation. For example, for a Spouse relation, the event could be a wedding, and the prompt could contain the question "Did you get married recently?". In response to the prompt, the user enters information, which is used to determine whether the relation exists. In one embodiment, the information is entered using an Edit View UI. This process can be repeated for multiple AskExist prompts.

For each relation annotated as "exists", a determination is made regarding whether an update is needed 325. In one embodiment, when determining whether an update is needed, inference is attempted first, based on information that has already been collected (e.g., information stored in the instantiated model 123). If the determination cannot be made through inference, then information is sought from the user by presenting one or more prompts. In one embodiment, an "AskChange" prompt that is associated with the current relation (part of the prompts 127) is presented. For example, for a Spouse relation, the prompt contains the question "Has there been a change in your marital status?". In another embodiment, an "AskExist" prompt that is associated with an event (part of the prompts 127) is presented. This event could be one that, if it occurred, could change an attribute of the current relation. For example, for a Spouse relation, the event could be a legal separation, and the prompt could contain the question "Have you obtained a legal separation?". In response to the prompt, the user enters information, which is used to determine whether an update is needed. In one embodiment, the information is entered using an Edit View UI. This process can be repeated for multiple AskChange prompts and AskExist prompts.

If the current relation's information (e.g., its attribute values) needs to be updated, the current relation is updated 330. In one embodiment, updating a relation 330 comprises updating a value of one of the relation's attributes. In this embodiment, only one version of each instantiated relation exists at a time (e.g., in the data repository 105). In another embodiment, multiple versions of the same instantiated relation can exist simultaneously. These versions can represent the instantiated relation during various time periods. In one embodiment, an element includes "begin" and "end" attributes that represent the start date and end date, respectively, between which the phenomenon modeled by the relation exists. The relation also includes a "past" attribute, which references the corresponding relation (if any) that existed before the begin date, and a "future" attribute, which references the corresponding relation (if any) that existed after the end date. In this way, a relation is "linked" to other versions of itself.

In one embodiment, where multiple versions of the same instantiated relation can exist simultaneously, updating a relation 330 comprises the following: The relation is copied. The non-copy relation is then updated with a new value for the attribute. The copy represents the relation before the change, while the non-copy represents the relation after the change. The values of the "end" attribute of the copy and the "begin" attribute of the non-copy are set to a timestamp that reflects their periods of validity. In addition, the "future" attribute of the copy references the non-copy, while the "past" attribute of the non-copy references the copy.

If the current relation has terminated (e.g., a Spouse relation is terminated due to a divorce), the current relation is removed 335. In one embodiment, removing a relation 335 comprises annotating the current entity (and the target entity of the relation) to reflect that the relation no longer exists. In addition, each entity's "begin" and "end" attributes are set to a timestamp that reflects their periods of validity.

In one embodiment, the current relation is deleted from the data repository 105. In this embodiment, information is not kept regarding past relations that no longer exist. In another embodiment, information of this sort is kept. The current relation's "begin" and "end" attributes are set to a timestamp that reflects the relation's period of validity.

If no update is needed (i.e., the current relation has not changed), the target instantiated entity of the current relation is added to the Update Entity Queue. This way, the target entity will also be updated 310, as described above.

Next, various steps are performed for each specialized relation (the "current relation") in the New Relation Queue. Relations were added to the New Relation Queue during step 320. These relations were previously annotated as "doesn't exist" or "unknown" but have now been determined to exist (step 315). The current relation is instantiated ("explored") and added to the instantiated model 345 (see FIG. 3B). In addition, its target specialized entity is added to the New Entity Queue 350. Steps 345 and 350 (of FIG. 3B) are similar to steps 250 and 260 (of FIG. 2), so their details won't be repeated here.

Next, various steps are performed for each specialized entity (the "current entity") in the New Entity Queue. Entities were added to the New Entity Queue during step 350. These entities were target entities of new relations. The current entity is instantiated and added to the instantiated model 355. For each specialized relation that could exist involving the current entity ("the current possible relation"), a determination is made regarding whether it does exist, and the current entity is annotated with the answer 360. If the current relation does exist, it is added to the New Relation Queue 365. Each specialized relation in the New Relation Queue ("the current actual relation") is instantiated and added to the instantiated model 370. In addition, the target specialized entity of the current actual relation is added to the New Entity Queue 375. Steps 355, 360, 365, 370, and 375 (of FIG. 3B) are similar to steps 220, 230, 240, 250, and 260 (of FIG. 2), so their details won't be repeated here.

After each specialized entity in the New Entity Queue has been processed (steps 355, 360, 365, 370, and 375), it is determined whether any relations exist in the New Relation Queue that have not yet been processed. (A relation may have been added to the New Relation Queue during step 365.) If they do, the flowchart 300 returns to steps 345 and 350 to process the unprocessed relations. Then, any entities in the New Entity Queue that have not yet been processed are processed. These steps (345, 350, 355, 360, 365, 370, and 375) repeat until all relations in the New Relation Queue and all entities in the New Entity Queue have been processed.

Note that the above description of the flowchart 300 does not address the order in which 1) the instantiated entities in the Update Entity Queue are updated (e.g., step 310), 2) the "doesn't exist" or "unknown" annotated relations are updated (e.g., steps 315 and 320), 3) the "exists" annotated relations are updated (e.g., steps 325, 330, 335, and 340), 4) the specialized relations in the New Relation Queue are explored (e.g., steps 345 and 350), 5) the specialized entities in the New Entity Queue are explored (e.g., starting with step 355), 6) the specialized possible relations are discovered (e.g., starting with step 360), and 7) the specialized actual relations are explored (e.g., starting with step 370). These orders are based on the flow control information 126 described above.

Other embodiments of the flowchart 300 are also possible, based on the flow control information 126. For example, the iteration loops for discovering, exploring, and updating entities and relations can be defined differently, thereby affecting the flow of the interview. In one embodiment (not shown), once a determination has been made that a current possible relation does exist (step 360), that actual relation is explored immediately (steps 370 and 375), rather than waiting for determinations to be made regarding the existence of other possible relations. In this embodiment, each possible relation is processed for both discovery and exploration (if the relation exists) before another relation is considered.

In another embodiment (not shown), once a target entity has been added to the New Entity Queue (step 375), that entity is explored immediately (step 355), rather than waiting for exploration of other actual relations (steps 370 and 375). In this embodiment, each entity is explored as soon as it is discovered.

Using an Instantiated Model

Figure 4:
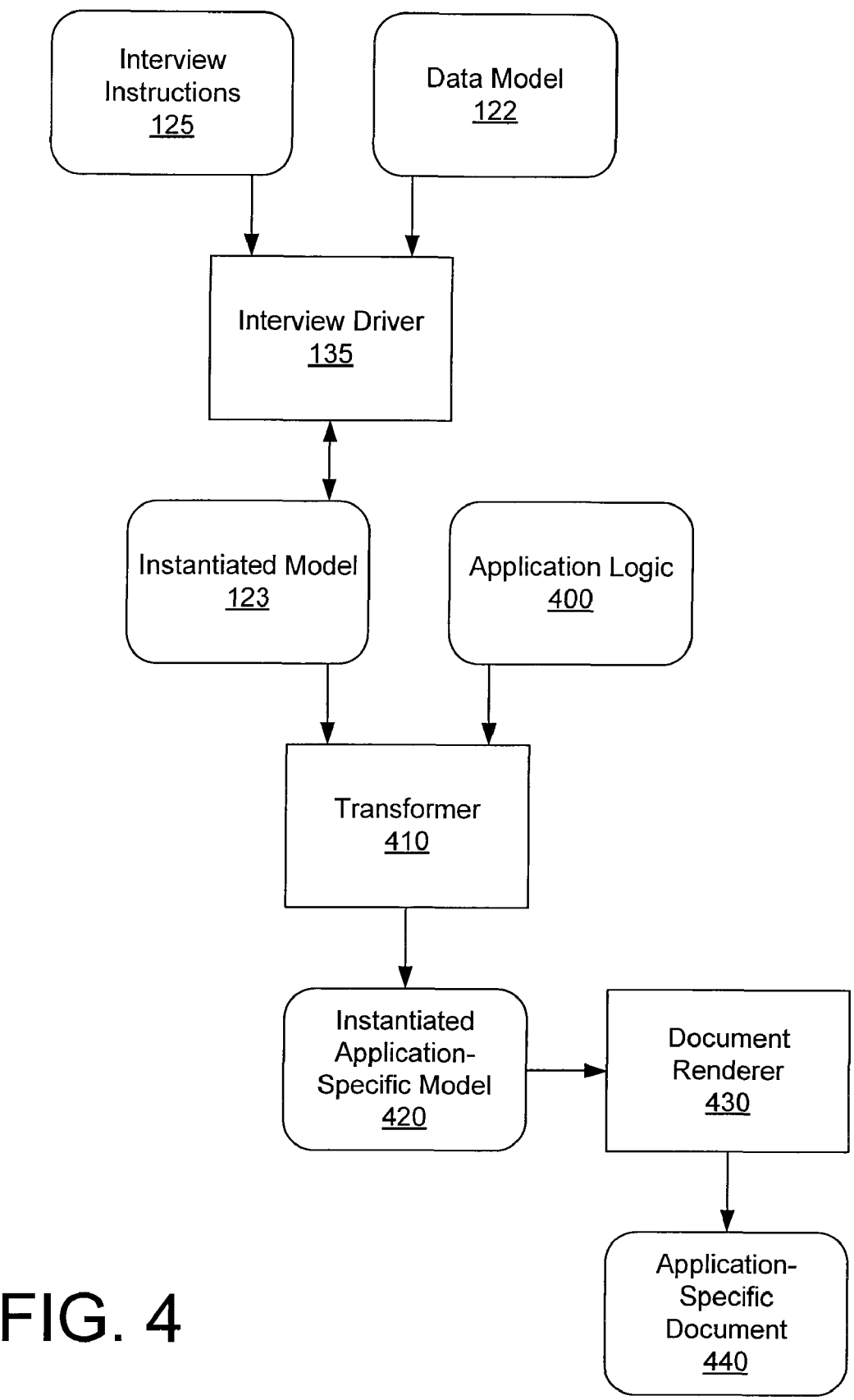
FIG. 4 illustrates a flow chart of how some of the components in FIG. 1 can be used, according to one embodiment of the invention.

FIG. 4 illustrates a flow chart of how some of the components in FIG. 1 can be used, according to one embodiment of the invention. In one embodiment, an application executes as follows: An interview driver 135 obtains information from the user and generates an instantiated model 123. A transformer 410 uses the instantiated model 123 and the application logic 400 to generate an instantiated application-specific model 420. Finally, a document renderer 430 generates an application-specific document 440 based on the instantiated application-specific model 420. This process will now be described in more detail.

Once the interview driver 135 has generated an instantiated model 123, information can be transformed from that domain to another domain (e.g., a financial model, such as tax or accounting). For example, a tax return preparation application is used to prepare a tax return and, in a particular use, will prepare a return for a particular taxpayer. In order to do that, the application needs to identify all sources of income and deductions applicable to that taxpayer.

In terms of the data model, the particular taxpayer is a Person entity or a Business entity, and the sources of income and deductions are entities (such as Assets or Liabilities) that are connected to the Person entity or Business entity by various relations (such as Own or Owe). These connections can be "direct" (e.g., along a path that includes only one relation edge), or they can be indirect (e.g., along a path that includes one or more intermediate entity nodes and multiple relation edges). An example of a direct connection is an Asset entity that is connected to the taxpayer entity via a path that includes one Own relation. An example of an indirect connection is an Asset entity that is connected to the taxpayer via a path that includes one Own relation, a Person entity, and a Spouse relation.

Each financial software application will have its own mapping from the data model to the appropriate financial model, whether the application be in the field of tax, accounting, or financial management. This mapping will correlate a financial concept (such as "wages" or "interest income") with one or more data model elements and indicate how to compute the value of that concept if necessary.

The transformer 410 generates an instantiated application-specific model 420 based on the instantiated model 123 and the application logic 400. The application logic 400 relates an instantiated model 123 to a target application-specific model by mapping data from the instantiated model 123 to the target model. In one embodiment, the target model is a financial model, such as tax or accounting. The mapping uses financial rules (e.g., accounting rules or tax laws) to correlate a concept in the target model with one or more instantiated model 123 elements and indicate how to compute the value of that concept if necessary.

Examples of financial models in the tax realm include state and federal income taxes for people and businesses. In one embodiment, the federal personal income tax financial model includes concepts like taxpaying entities (e.g., a person or married couple), income types (e.g., salary or interest), and deduction types (e.g., local taxes or interest on a mortgage). In a personal income tax preparation application, the application logic 400 would correlate these concepts with one or more instantiated model 123 elements and indicate how to compute the values of those concepts if necessary.

For example, the taxpaying entity would correspond to either the Person entity representing the taxpayer (in the case of an individual taxpayer) or two Person entities that share a Spouse relation (in the case of a married couple filing jointly). The social security number of the taxpaying entity (usually needed for a tax filing) would then correspond to the value of the Person entity's SSN attribute (in the case of an individual taxpayer).

A source of income would correspond to, for example, a job salary (represented by the Salary attribute of a WorkFor relation) or interest on a bank account (represented by a Financial Asset entity, such as a Savings Account Asset entity). If the taxpaying entity earned income from multiple sources, the total income earned would be the sum of these amounts. In this case, the application logic 400 would specify both 1) corresponding instantiated elements and 2) how to compute the financial concept (here, total income) based on those elements. (In the social security number example above, the social security number of the taxpaying entity was already present in the instantiated model 123, so no computation was necessary in order to determine it.)

As discussed above, the instantiated model 123 can be expressed in any form or data structure. Similarly, the target application-specific model can be expressed in any form or data structure, and it is not necessary that it be expressed in the same way as the instantiated model 123. In one embodiment, both the instantiated model 123 and the target model are expressed in XML. The XML describes the structure of the model, including its constituent parts. In one embodiment, the XML is specified using an XML Schema according to the XML Schema Definition language (XSD).

Appendix C1 includes an XSD that specifies an instantiated model 123, according to one embodiment of the invention. Here, the XSD includes several elements, such as LastName, Gender, Employer, and Salary. The XSD also includes several composite types, such as PersonType, NameType, and ResidenceType.

Appendix C2 includes an XSD that specifies a target financial model, according to one embodiment of the invention. Here, the financial model is federal personal income tax and, specifically, Internal Revenue Service (IRS) Form 1040. Here, the XSD includes several elements, such as LastName, AddressLine, and SSN. The XSD also includes several composite types, such as IncomeType, Line7Type, and TaxPayerType.

The application logic 400 specifies how to generate an instantiated application-specific model 420 given an instantiated model 123 and a target application-specific model (e.g., federal personal income tax). In one embodiment, the application logic 400 is an XML document. For example, the application logic 400 can be an XSL Transformation (XSLT) document that, when executed (see below regarding the transformer 410), performs the mapping function and generates the instantiated application-specific model 420.

If the application logic 400 is an XSLT document, the transformer 410 can be, for example, an XSLT engine. Alternatively, the application logic 400 and the transformer 410 can be combined into a single program that generates the instantiated application-specific model 420 based on the instantiated model 123. In one embodiment, the transformer 410 uses XSLT transformation to perform mapping and calculation. Transformation rules and/or calculations are specified in the mapping. The transformer 410 can include an XSLT engine, such as the Xalan engine (part of the Apache XML Project) or the Altova XSLT Engine (available from Altova® of Beverly, Mass.).

Once an instantiated application-specific model 420 exists, a financial document (such as a tax return or balance sheet) can be generated. The document renderer 430 generates an application-specific document 440 (such as a tax form or accounting report) based on the instantiated application-specific model 420 generated by the transformer 410. In one embodiment, the instantiated application-specific document 440 is described as a web form (e.g., including various user interface elements) using the XForm standard. HTML (HyperText Markup Language) or XHTML (eXtensible HyperText Markup Language) is generated from the XForm definition using XSLT transformation. The HTML or XHTML can then be rendered by a web browser.

Note that an application need not execute all of the components shown in FIG. 4 each time it executes. For example, if a user has already generated one application-specific document 440 and now wants to generate a different one, the application need not execute the interview driver 135 again. This is because the interview driver 135 is meant to generate an instantiated model 123, and an instantiated model 123 already exists. (It was used to generate the first application-specific document 440.) The interview driver 135 need only be executed when no instantiated model 123 exists (e.g., the first time the application is run) or when an instantiated model 123 exists but needs to be modified (e.g., when a phenomenon represented by the instantiated model 123 has changed).

In one embodiment (not shown), the application also includes a workflow engine and/or a document management engine. The workflow engine manages the user's progress during the interview and document preparation process and enables the user to navigate between questions (either forward or backward), save a current session, and reload a saved session. The document management engine stores user information (e.g., application-specific documents 440 that have been generated) and provides features such as access control, versioning, and editing.

Design-Time Tools

As discussed above, the run-time engines 110 execute an application based on the contents of the data repository 105. Thus, by changing the contents of the data repository 105, different applications can be created.

The contents of the data repository 105 can be expressed in any form or data structure. If the contents are stored in human-readable form (e.g., source code or XML), they can be edited directly to modify an existing application or create a new application.

If the contents are non-human-readable (or if direct editing is undesirable), a design tool can be created to enable a user (here, an application designer or programmer) to create and/or modify the contents of the data repository 105. In one embodiment, each type of information stored in the data repository 105 has a separate design tool that enables the information to be created and/or modified.

Figure 5:
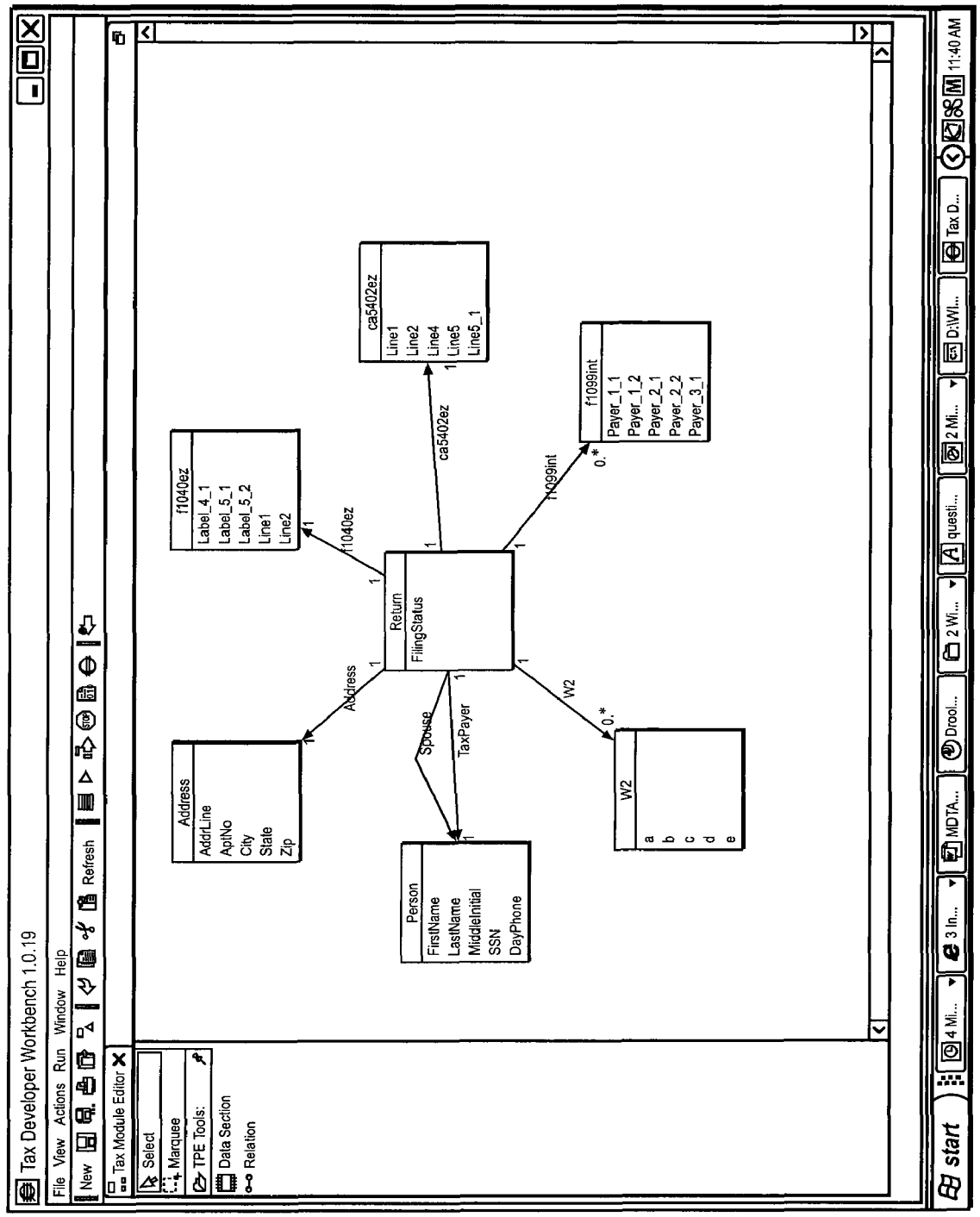
FIG. 5 illustrates a user interface of a visual modeler, according to one embodiment of the invention.

For example, in one embodiment, the data model 122 is created and/or modified using a visual modeler. In one embodiment, the visual modeler features a drag-and-drop interface so that a user can define and/or modify specialized elements (e.g., based on the elements of the meta-model 121). The specialized elements can then be used for a particular application. In another embodiment, the visual modeler includes a library of specialized elements that have already been defined (by the same user or by others). This library can organize and subdivide specialized elements so that they are easier to find while using the visual modeler. For example, the organization can be based on a financial model (e.g., tax versus accounting) and, within that model, different types of applications (e.g., state versus federal or personal versus business). FIG. 5 illustrates a user interface of a visual modeler, according to one embodiment of the invention.

Figure 6:
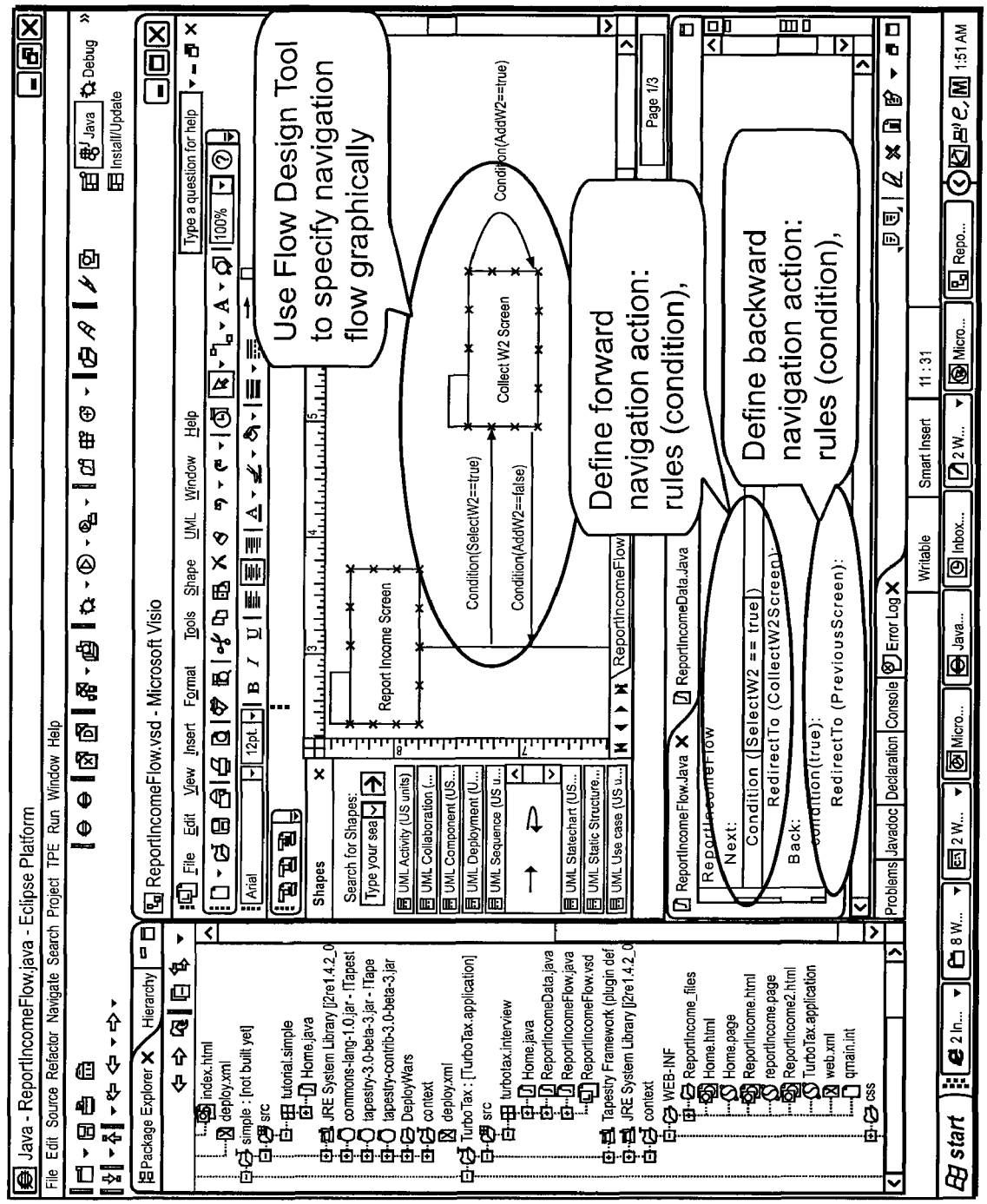
FIG. 6 illustrates a user interface of an interview flow designer, according to one embodiment of the invention.

In one embodiment, the interview instructions 125 are created and/or modified using an interview prompt designer and an interview flow designer. In one embodiment, the interview prompt designer includes a library of interview prompts (including templates and variables) that have already been defined (by the same user or by others). This library can organize and subdivide the prompts so that they are easier to find while using the interview prompt designer. For example, the organization can be based on a specialized element (e.g., a Person entity) and, within that specialized element, different types of prompts (e.g., AskExist, AskDetail, and AskChange). The interview flow designer can, for example, enable a user to graphically specify a discovery or exploration flow and to define forward and backward traversal actions based on rules and conditions. FIG. 6 illustrates a user interface of an interview flow designer, according to one embodiment of the invention.

Figure 7:
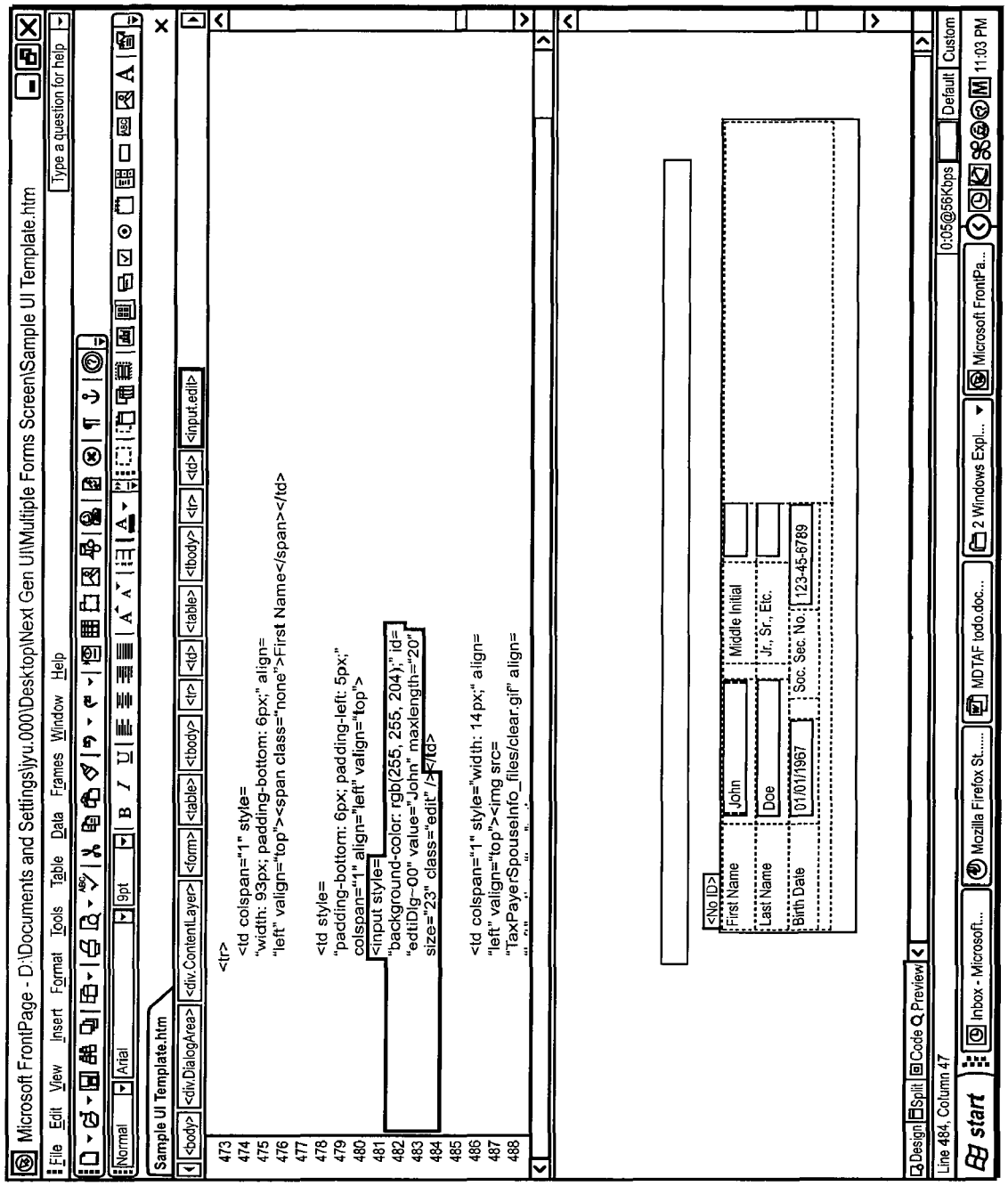
FIG. 7 illustrates a user interface of a UI component designer, according to one embodiment of the invention.

The user interface (UI) information 128 is created and/or modified using a UI component designer. In one embodiment, the UI component designer features a what-you-see-is-what-you-get (WYSIWYG) interface so that the UI component being designed is presented to the designing user as it would be presented to the end-user. In another embodiment, the UI component designer includes a library of UI components that have already been defined (by the same user or by others). This library can organize and subdivide the components so that they are easier to find while using the UI component designer. For example, the organization can be based on a specialized element (e.g., a Person entity) and, within that specialized element, different types of functionality (e.g., Add View, Edit View, Detail View, and Summary View). FIG. 7 illustrates a user interface of a UI component designer, according to one embodiment of the invention.

Figure 8:
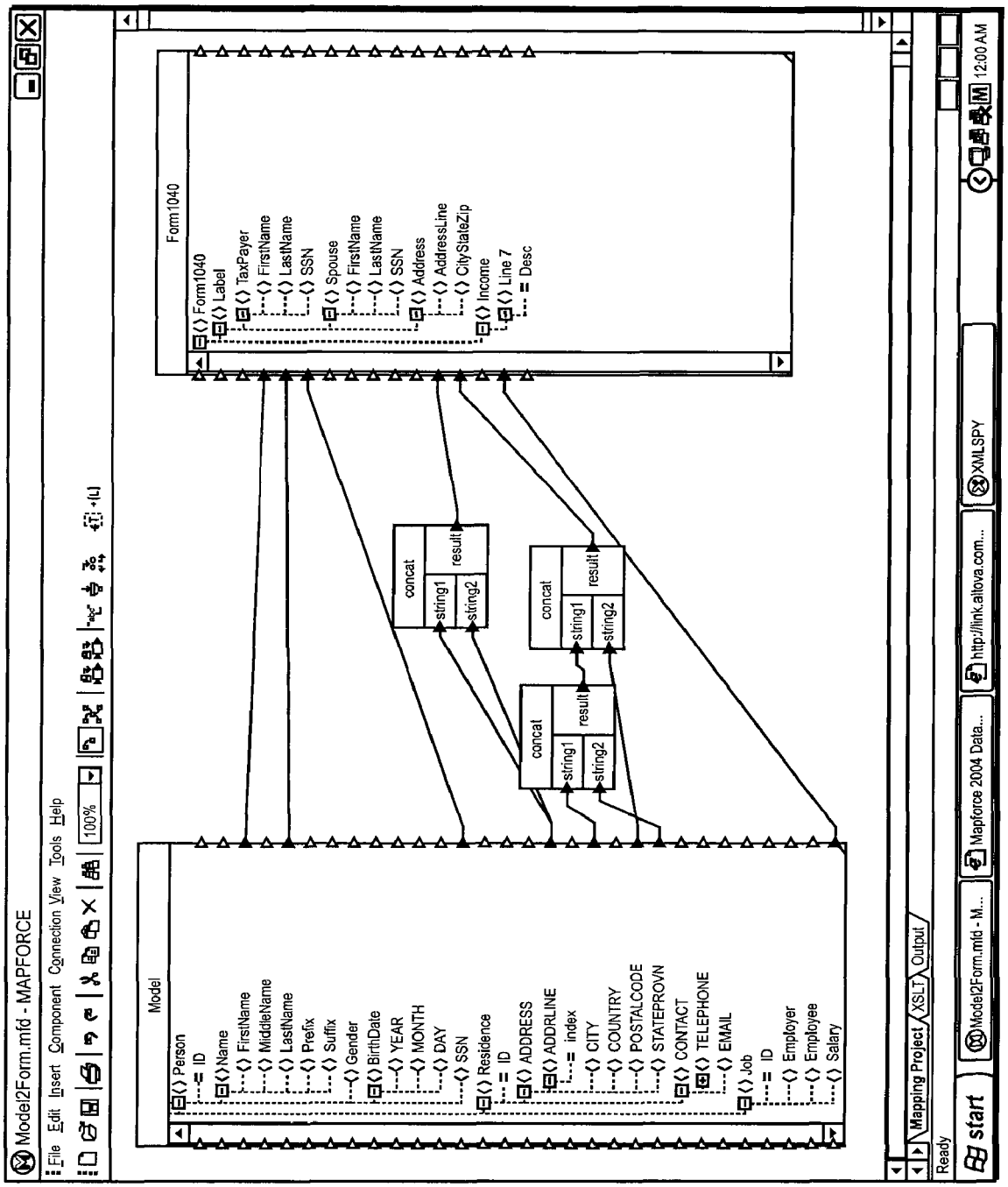
FIG. 8 illustrates a user interface of a model mapper, according to one embodiment of the invention.

The application logic 400 is created and/or modified using a model mapper. In one embodiment, the model mapper features a graphical interface that enables a user to correlate (map) a value in one model (such as the data model 122) with a value in another model (such as an application-specific model) and specify a computation. FIG. 8 illustrates a user interface of a model mapper, according to one embodiment of the invention. In one embodiment, the model mapper uses the MapForce™ software application (available from Altova® of Beverly, Mass.). Appendix D includes XSLT code that was generated by a model mapper.

The left side of the user interface shows the origination model. Here, the origination model is a data model 122 that represents a person who has a name, birthdate, residence, and job. The right side of the user interface shows the destination model. Here, the destination model is a financial model (specifically, IRS Form 1040) that represents a taxpayer who has a spouse and an income.

The middle of the user interface shows the correlation between the model on the left and the model on the right. A line connecting two elements (one from each model) denotes that the two elements are related to one another. If computation is performed on an origination element before its value is "assigned" to a destination element, that computation is shown in the middle of the user interface. For example, the ADDRLINE element in the origination model has two strings (string1 and string2). These strings are concatenated and the resulting string is assigned to the AddressLine element in the destination model. Note that computations can be chained together. For example, the CITY and STATEPROVN elements in the origination model are concatenated to form a resulting string, and that string is concatenated with the POSTALCODE element in the origination model. The final string is then assigned to the CityStateZip element in the destination model.

Design-time tools can also include a workflow engine and/or a content management engine. The workflow engine manages the software team's progress during the design and implementation of the software application and enables portions of the application to be reviewed, approved, and deployed. The content management engine stores data underlying the software application that is being developed, such as source code, images, and models, and provides features such as access control, versioning, and editing.

Example

Financial Software

Financial software applications, such as tax return preparation, accounting, and financial management applications, differ from one another in various ways. Most of these differences stem from the fact that the applications have different primary functions or purposes. While a tax return preparation application can be used to determine a person's or business' tax liability, an accounting application or financial management application can be used to track and analyze a person's or business' assets and liabilities. These different purposes cause the applications to need different types of financial information. For example, a tax application needs information about a person and that person's job and employer, while an accounting application needs information about a business and that business' customers and sales.

Applications also differ in how they manipulate information in the context of the application's primary purpose. For example, a tax return preparation application might classify an amount as an income versus a deduction, while an accounting application might classify an amount as an asset versus a liability. Yet another way in which applications differ is the type of financial document generated. For example, a tax application might generate a tax return, while an accounting application might generate a balance sheet.

Despite all their differences, financial software applications do have attributes in common. They receive financial information, manipulate it according to a set of rules, and generate financial documents. If the differences are compartmentalized, then a common framework can be used to generate different types of financial software applications. For example, one data modeling technique could be used to represent information needed by financial software applications. Information in the data model could then be manipulated in different ways depending on the purpose of the software application (tax, accounting, etc.). Finally, different financial documents could be generated. The framework described above can be used to create different types of financial software applications, using a data model of the underlying phenomena that are meaningful to each application.

In one embodiment, information needed by a financial software application is defined by the model information 120, which includes a meta-model 121, a data model 122, and an instantiated model 123. The meta-model 121 includes four types of elements: entities, relations, rules, and events. The data model 122 includes specialized, or application-specific, versions of these elements, as will be explained below.

An entity represents a person, place, or thing. In one embodiment, the data model 122 includes the following specialized entities: Person, Business, Residence, Site, Liability, Asset, School, Charity, Government, and Medical Institute. Other specialized entities can be defined as appropriate based on the financial software application that is being created. Different software applications can be concerned with different entities of the same specialized type. For example, a tax return preparation application can be concerned with a Person entity that represents an individual taxpayer and a Business entity that represents an employer, while an accounting application can be concerned with a Person entity that represents a customer and a Business entity that represents a vendor.

Different specialized entities can have different types of characteristics or attributes. In one embodiment, a Person entity has the following attributes: Name, DateOfBirth, Gender, MarriageStatus, Citizenship, and SSN (social security number). A Business entity has the following attributes: Name, DateEstablished, Site, FederalID, and StateID.

The value of an attribute can be a simple data type (such as a number or string) or a composite data type, which includes multiple subparts. For example, an address value (a composite data type) can include multiple strings (e.g., for city and state) and numbers (e.g., for zip code). An attribute value can be entered by a user, or it can be inferred or derived based on other information in the instantiated data model 123. For example, the MarriageStatus value can be inferred based on the (non)existence of a Spouse relation (see below). A value representing the number of dependents can be derived based on the number of Dependent relations (see below). A user can override an inferred or derived value by entering a different value. If this different value conflicts with the rest of the instantiated data model 123, then a warning can be presented to the user.

FIG. 9 illustrates a table of specialized entities and their characteristics, according to one embodiment of the invention. A "derived entity" is a sub-type of a specialized entity. For example, a Residence entity can be a Primary Residence entity or a Secondary Residence Entity. A Liability entity can be a Mortgage Liability entity, a Car Loan Liability entity, an Equity Loan Liability entity, or a Personal Loan Liability entity.

A relation represents an association between multiple entities. In one embodiment, the data model 122 includes the following specialized relations: Spouse, Parent/Child, Dependent, WorkFor, Education, LiveIn, Station, Volunteer, Own, Owe, and Pay/Receive. Other specialized relations can be defined as appropriate based on the financial software application that is being created (e.g., Product, Vendor, and Supplier). Different specialized relations can have different types of characteristics or attributes. For example, a Spouse relation exists between two Person entities and has two Role attributes (one for each Person entity). The value of Role for the male Person is "husband," and the value of Role for the female Person is "wife." A WorkFor relation exists between one Person entity and one Business entity and has the attributes JobTitle, Salary, Benefits, Expenses, and Role (one for each entity). The value of Role for the Person entity is "employee," and the value of Role for the Business entity is "employer." Similar to an entity attribute, the value of a relation attribute can be a simple data type or a composite data type. FIG. 10 illustrates a table of specialized relations and their characteristics, according to one embodiment of the invention.

Figure 11:
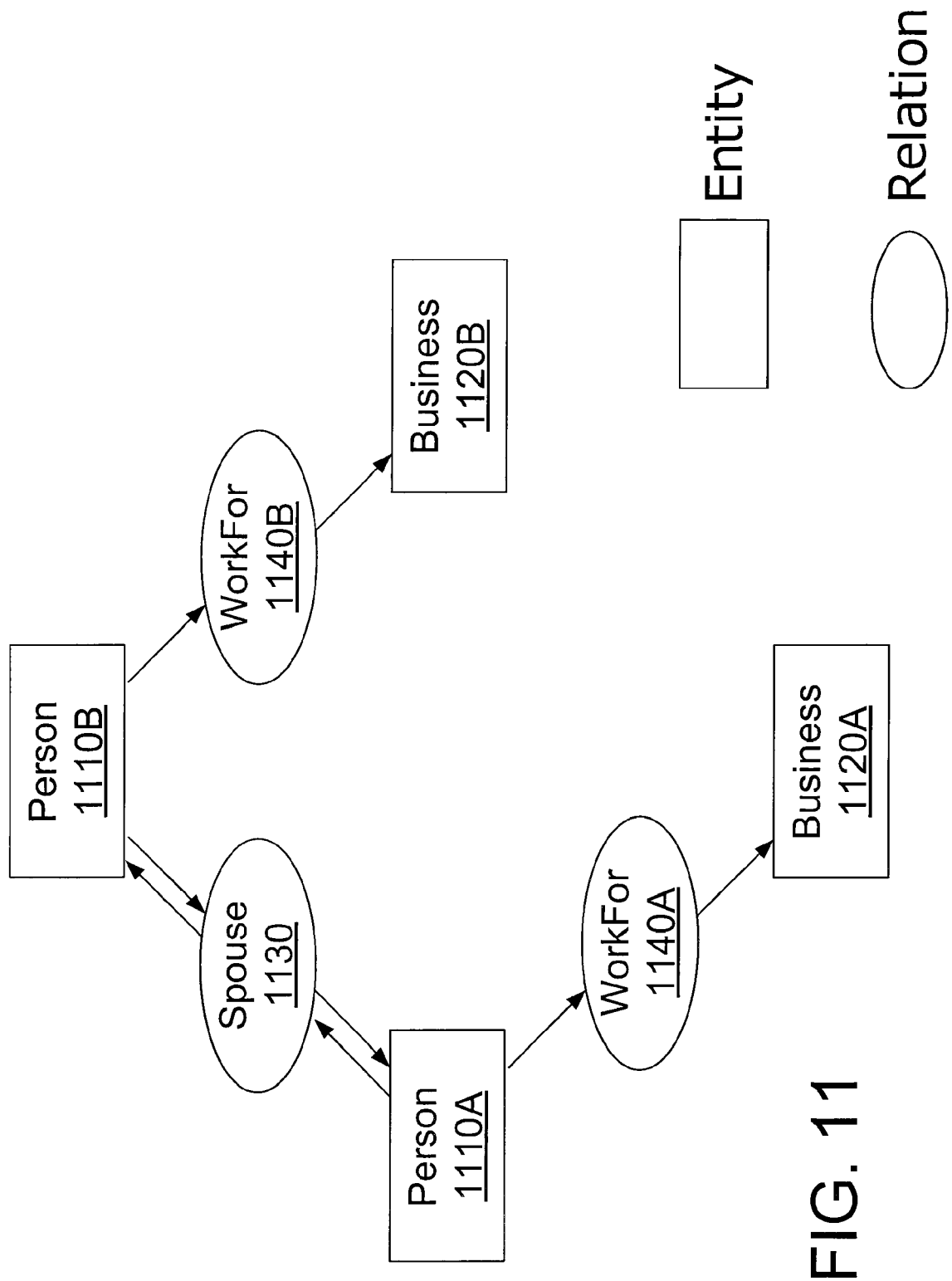
FIG. 11 illustrates an entity-relationship diagram that represents a data model, according to one embodiment of the invention.

In one embodiment, the data model 122 is represented as an entity-relationship (ER) model and is visualized using an ER diagram. FIG. 11 illustrates an entity-relationship diagram that represents a data model, according to one embodiment of the invention. In the illustrated embodiment, an entity is shown by a rectangle, and a relation is shown by an oval. The illustrated embodiment includes four entities (two Person entities 1110A, 1110B and two Business entities 1120A, 1120B) and three relations (one Spouse relation 1130 and two WorkFor relations 1140A, 1140B).

Each specialized relation has a specific meaning. This meaning can differ based on the relative "positions" of the entities with which the relation is associated. For example, a Dependent relation exists between two Person entities 1110. But there is no way, based solely on the Person entities 1110, to identify which Person entity 1110 is the dependent. In order to handle cases such as this, a line in an ER diagram can be directional, and its direction will indicate the meaning of the relation.

In one embodiment, a particular phenomenon is represented by an element of the data model 122 that has been instantiated (that is, an element which contains a value for one or more of its attributes). For example, a taxpayer is represented by an instantiated Person entity. The instantiated Person entity would have attribute values that correspond to the state of the taxpayer, such as the taxpayer's name, date of birth, and gender. Similarly, a job is represented by an instantiated WorkFor relation. The instantiated WorkFor relation would have attribute values that correspond to the state of the job, such as the job title and salary.

Consider a tax return preparation application. Information that is relevant to a person's or business' tax liability would be stored in instantiated entities and relations. If entities were viewed as nodes and relations were viewed as edges, these instantiated entities and relations would be "connected" (in a graph sense) to the entity that represented the person or business whose tax liability was being determined. In one embodiment, an entity's tax liability can be determined by analyzing only the information that is stored in entities and relations that are connected to the entity of interest. In one embodiment, execution of the financial software application is related to traversing the data model "graph," as explained above.

For example, if the data model elements illustrated in FIG. 11 were instantiated, the instantiated data model 123 would represent a first person (Person entity 1110A), a second person (Person entity 110B), facts about their marriage (Spouse relation 1130), and facts about their jobs (WorkFor relations 1140A, 1140B). This instantiated data model 123 could be used, for example, to prepare a tax return for the first person (Person entity 1110A) (assuming, of course, that no other sources of income or deductions were present). The information in the instantiated data model 123 would be stored in data structures. For example, the attribute values of each element (such as an entity or relation) could be stored in a separate data structure. The tax return preparation software would access the data structures in order to determine the tax liability and generate a tax return.

In one embodiment, the phenomenon modeled by an instantiated element exists in real life, and the attribute values of the instantiated element reflect the state of the real-life phenomenon. In this embodiment, the instantiated element reflects reality. However, it is also useful for an instantiated element not to reflect reality (e.g., as part of a hypothetical situation used for financial forecasting). In that embodiment, the phenomenon modeled by the instantiated element does not exist in real life (or, if the phenomenon does exist, the attribute values of the instantiated element do not reflect the state of the real-life phenomenon).

A rule represents a restriction placed on an entity or relation. If an entity or relation does not obey its rules, then it is invalid. In one embodiment, a rule for an entity specifies how to infer the value of a particular attribute. For example, if a Person entity 1110 has an Age attribute, a rule can specify that the value of this attribute is equal to the difference between the "current" timestamp (e.g., the date for which the model information is valid) and the Person's DateOfBirth attribute value. In another embodiment, a rule for an entity specifies whether a value of a particular attribute is valid. For example, a rule can specify that the value of a Person entity's Age attribute must not exceed 120.

A rule can also express a connection between an entity (e.g., an attribute) and a relation. For example, if a Person entity 1110 has a MarriageStatus attribute, a rule can specify that the value of this attribute is "Married" if a Spouse relation 1130 exists and "Unmarried" if a Spouse relation 1130 does not exist. As another example, in one embodiment, the data model 122 includes the following specialized rule for the Spouse relation 1130: If the value of the Gender attribute of one associated Person entity 1110 is Male, then the value of the Gender attribute of the other associated Person entity 1110 must be Female (and vice versa). In this embodiment, if a Spouse relation 1130 has just been discovered, it can be inferred that 1) an additional Person entity 1110 exists (i.e., the spouse) and 2) the additional Person entity 1110 has a Gender attribute value of either Female (if the other Person's Gender attribute value is Male) or Male (if the other Person's Gender attribute value is Female). Other specialized rules can be defined as appropriate based on the financial software application that is being created.

Real-life events can affect people, places, and things and the associations between them. Since these phenomena are represented in an instantiated data model 123, it follows that real-life events can also affect the instantiated data model 123. In one embodiment, the effects on an instantiated data model 123 of a real-life event include changing attribute values of existing entities and relations, creating new entities and relations, and removing existing entities and relations. For example, if a person got married (a Marry event), the value of the associated Person entity's MarriageStatus attribute would change, and a Spouse relation 1130 would be created. If a person received a raise (a ChangeBenefits event), the value of the associated WorkFor relation's Salary attribute would change. If a person were born (a Born event), a Person entity 1110 would be created, and if a person died (a Die event), a Person entity 1110 would be removed. Similarly, if a business started operations, a Business entity 1120 would be created, and if a business ceased operations, a Business entity 1120 would be removed.

FIG. 12 illustrates a table of specialized events and their characteristics, according to one embodiment of the invention. In the illustrated embodiment, the Frequency column represents how many times an event can occur for the same Person entity. For example, a Born event and a Die event can each occur only once (because a person can be born and die only once). A Frequency value of "0 . . . x" indicates that the event can occur anywhere from 0 times to x times, where x is any positive integer. If x is * (e.g., a Frequency value of 0 . . . *), then x has no limit, and the event can occur anywhere from 0 times to an infinite number of times.

Since the world can change over time, an instantiated data model 123 that represents the world (and its associated diagram) can also change over time. Thus, an instantiated data model 123 is valid for a specific period of time. If an event affects an instantiated data model 123, the event acts a link between two instantiated data models 123: one that represents the world before the event and one that represents the world after the event. The point in time when the event occurred would signal the end of the first model's validity and the beginning of the second model's validity. In one embodiment, every event has an associated timestamp that indicates when the event occurred. This timestamp is used to indicate, for example, when a pre-event model's period of validity ends or a post-event model's period of validity begins.

Consider again the instantiated data model 123 shown in FIG. 11. Assume that a tax preparation application was being used to determine the tax liability for the first person (Person entity 1110A). If that person were to get a divorce, Spouse relation 1130 would be removed, thereby "disconnecting" Person entity 1110B, WorkFor relation 1140B, and Business 1120B from the data model graph for Person entity 1110A. This disconnection makes sense, since information regarding the second person and that person's job and employer no longer affects the first person's tax liability.

In terms of events, the instantiated data model 123 shown in FIG. 11 would be valid until the divorce, and the "disconnected" instantiated data model 123 described above would be valid after the divorce. The divorce event would "link" these two instantiated data models 123 and signal the end of the first model's validity and the beginning of the second model's validity.

Figure 13:
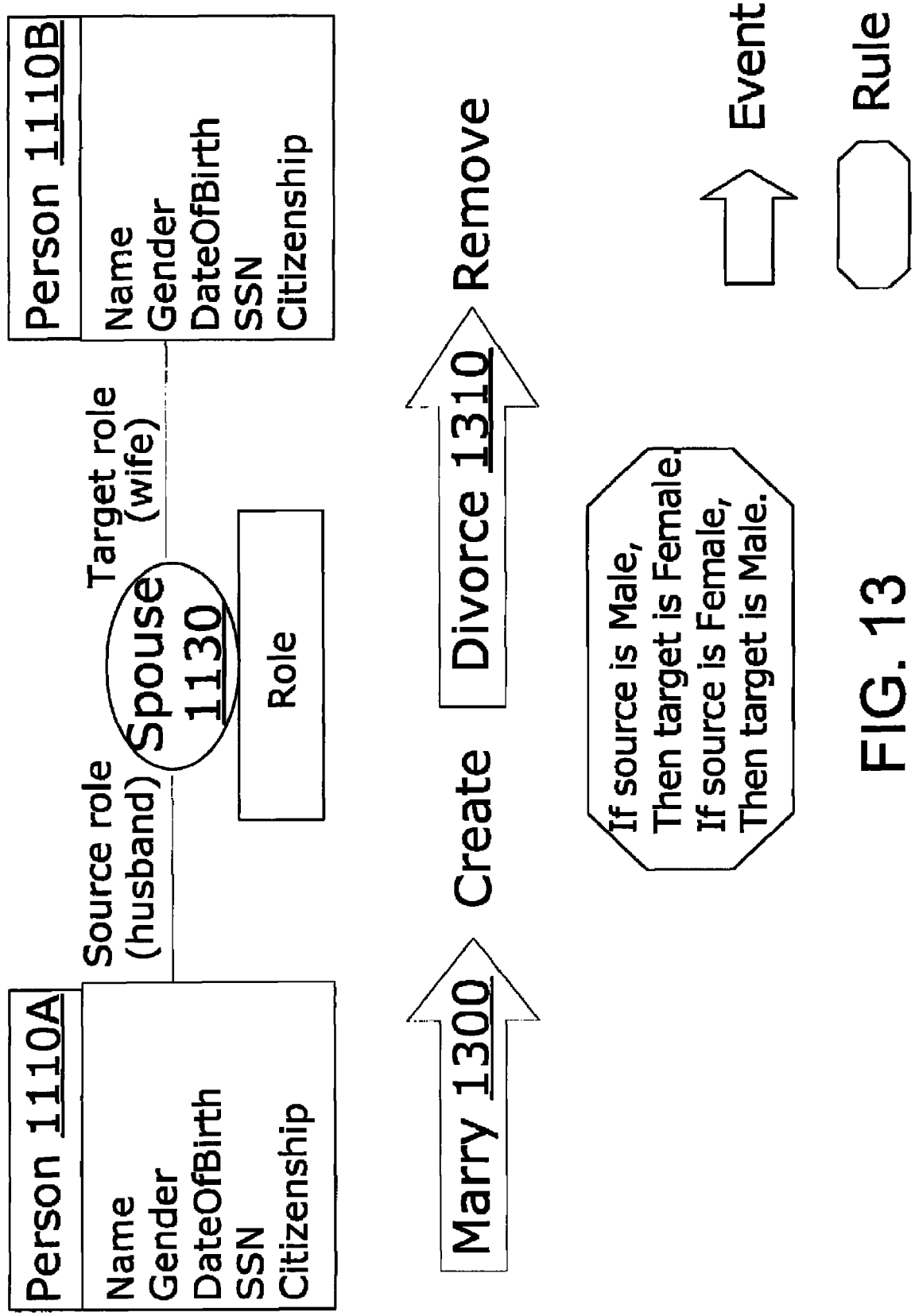
FIG. 13 illustrates a block diagram of information regarding a Spouse relation, according to one embodiment of the invention.

FIG. 13 illustrates a block diagram of information regarding a Spouse relation, according to one embodiment of the invention. In the illustrated embodiment, a rule is shown by an octagon, and an event is shown by an arrow. As described above, a Spouse relation 1130 exists between two Person entities 1110A, 1110B. It is created by a marriage (a Marry event 1300) and is removed by a divorce (a Divorce event 1310). In the illustrated embodiment, a Spouse relation 1130 has two Role attributes and one rule 1320 associated with it.

Figure 14:
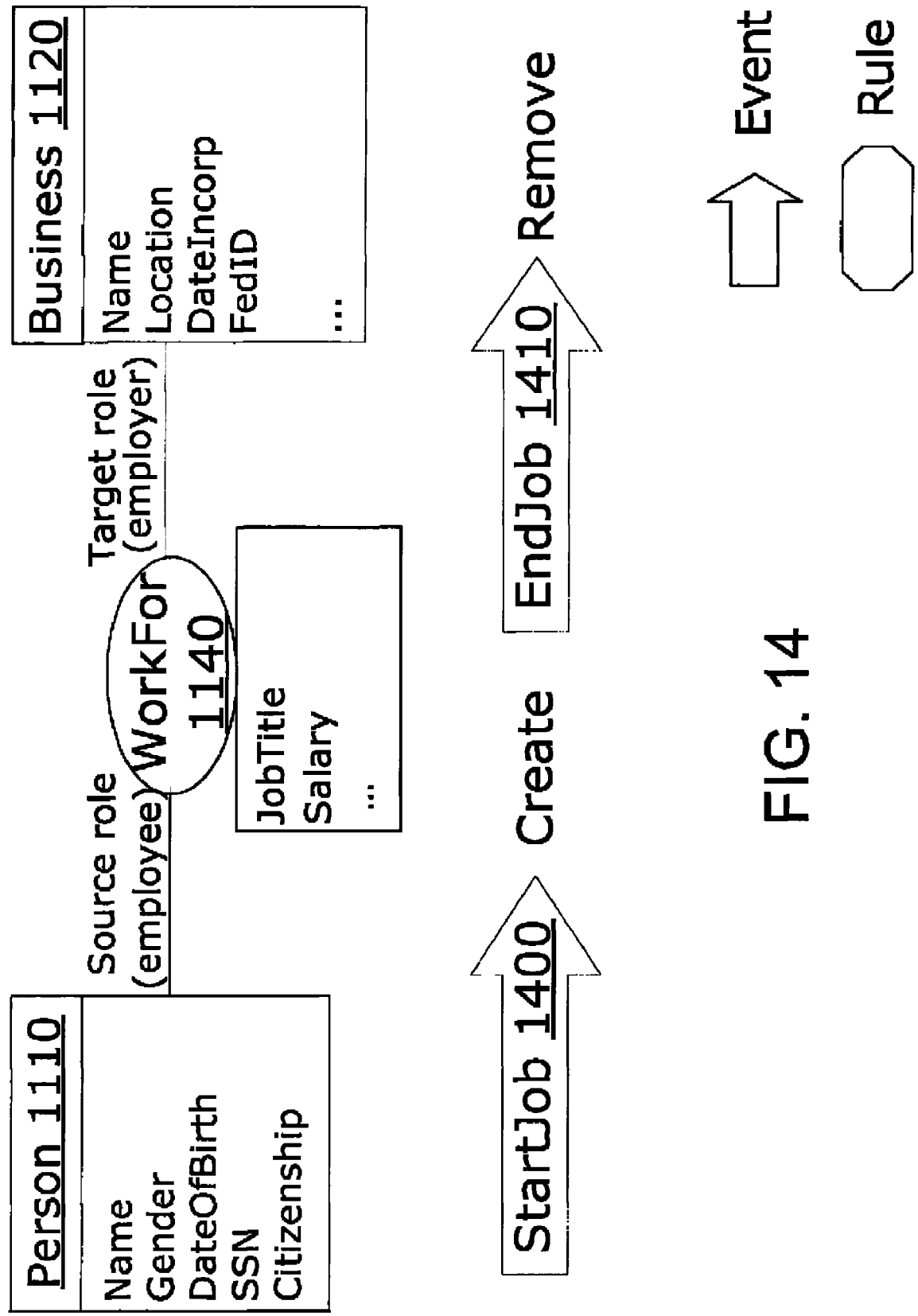
FIG. 14 illustrates a block diagram of information regarding a WorkFor relation, according to one embodiment of the invention.

FIG. 14 illustrates a block diagram of information regarding a WorkFor relation, according to one embodiment of the invention. As described above, a WorkFor relation 1140 exists between a Person entity 1110 and a Business entity 1120. It is created by a person starting a job (a StartJob event 1400) and is removed by a person's quitting, firing, or lay-off (an End-Job event 1410). In the illustrated embodiment, a WorkFor relation 1140 has two attributes (JobTitle and Salary). Although no rules are shown, one possible rule is that a person who has a job must be of legal working age (where the person's age is determined based on the date range of the instantiated data model 123 and the value of the Person entity's DateOfBirth attribute).

Figure 15:
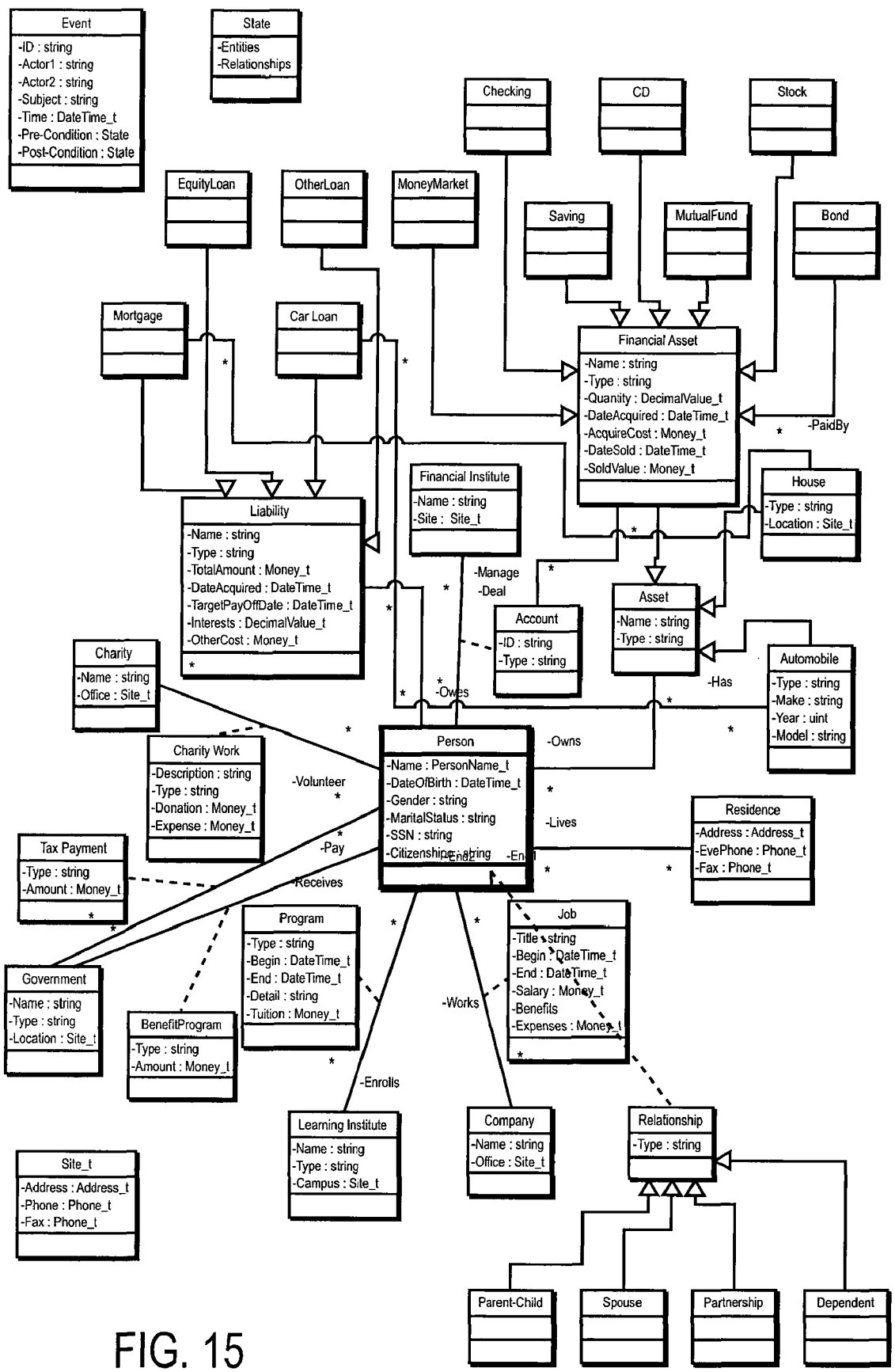
FIG. 15 illustrates a Unified Modeling Language (UML) diagram that represents a data model, according to one embodiment of the invention.

In one embodiment, the data model 122 is represented as a Unified Modeling Language (UML) model and is visualized using a UML diagram. FIG. 15 illustrates a UML diagram that represents a data model, according to one embodiment of the invention. The UML diagram can be thought of as a graph, where entities are nodes and relations are edges. The data model includes several specialized entities, some of which are grouped together into various levels of abstraction using sub-types ("derived entities"). For example, an Asset entity 1500 ("owned" by a Person entity 1110) can be a Building Asset entity 1505 (e.g., a house), a Vehicle Asset entity 1510 (e.g., a car or boat), or a Financial Asset entity 1515. A Financial Asset entity 1515 can be, for example, a Savings Account Asset entity 1520, a Checking Account Asset entity 1525, a Money Market Account Asset entity 1530, a CD Account Asset entity 1535, a Mutual Fund Asset entity 1540, a Stock Asset entity 1545, or a Bond Asset entity 1550.

Similarly, a Liability entity 1555 ("owed" by a Person entity 1110) can be a Mortgage Liability entity 1560, an Equity Loan Liability entity 1565, a Vehicle Loan Liability entity 1570, or a Personal Loan Liability entity 1575. Other specialized entities shown in the illustrated embodiment include financial institutions, accounts, charities, governments, educational institutions, and residences.

The data model 122 also includes several specialized relations (shown by dashed lines), some of which are grouped together into various levels of abstraction using sub-types ("derived relations"). For example, a Relationship relation 1580 exists between two Person entities 1110 and can be, for example, Parent-Child 1585, Spouse 1130, Partnership 1590 (e.g., a business partnership), and Dependent 1595. A WorkFor relation 1140 exists between a Person entity 1110 and a Business entity 1120.

If one or more elements of the data model 122 are instantiated, the instantiated data model 123 represents a state of the world. Specifically, it describes various entities and relations in graph form. The world state that is represented can be true for a particular time period, or it can be hypothetical.

FIG. 15 illustrates a UML diagram of one embodiment of a data model 122. Other embodiments of a data model are also possible. These embodiments can include different specialized entities and relations and/or specialized entities and relations with different attributes, meanings, or rules. Similarly, these embodiments can include different specialized events and/or specialized events with different effects or meanings.

In one embodiment, the elements in the meta-model 121 are expressed using eXtensible Markup Language (XML). For example, the following XML code can represent an entity:

```
<GenericType name="EntityType">
    <Property name="__oid" type="String" required="true"/>
    <Property name="__alias" type="String" required="true"/>
    <Property name="__begin" type="Date" required="true"/>
    <Property name="__end" type="Date" required="true"/>
    <Property name="__past" type="ReferenceType"
    subtype="EntityType:Self"
required="true"/>
    <Property name="__future" type="ReferenceType"
    subtype="EntityType:Self"
required="true"/>
</GenericType>
```

In this example, the "begin" and "end" properties represent the start date and end date, respectively, between which the entity exists. The corresponding entity (if any) that existed before the begin date is referenced by the "past" property, while the corresponding entity (if any) that existed after the end date is referenced by the "future" property. The past and future properties are one way to "link" an element to other versions of that element, as mentioned above with respect to, e.g., steps 310 and 330 of FIG. 3A.

As discussed above, a specialized element of the data model 122 has one or more attributes. In one embodiment, a specialized element is defined by its attributes and information regarding these attributes. Information about an attribute can include, for example, a default value for the attribute and validation logic that determines whether an attribute value is correct and/or of the proper format.

Like an element of the meta-model 121, an element of the data model 122 can also be expressed using XML. At runtime, the financial software application can access this information in order to create and instantiate a data model 122 element as needed. In one embodiment, a specialized element is expressed as an extension of a "generic" element in the meta-model 121. For example, a Person entity in the data model 122 can be expressed as an extension of the entity element in the meta-model 121. The following is an example of XML code that represents a Person entity:

```
<GenericType name="Person" base="EntityType">
    <Property name="name" type="GenericType"
    subtype="PersonName" required="true"/>
    <Property name="dateOfBirth" type="Date" required="true"/>
    <Property name="dateOfDeath" type="Date"/>
    <Property name="gender" type="String" required="true"/>
    <Property name="ssn" type="String" required="true"/>
    <Property name="citizenship" type="String" required="true"/>
</GenericType>
```

Consider an instantiated Person entity with the following attribute values: Name (Dr. John Jay Doe), DateOfBirth (Feb. 1, 1950), DateOfDeath (none), SSN (123456789), and Citizenship (USA). The entity could be expressed by the following XML code:

```
<Person>
    <_oid>EN2</_oid>
    <_alias />
    <_begin>02/01/1950</_begin>
    <_end />
    <name>
        <firstName>John</firstName>
        <lastName>Doe</lastName>
        <middleName>Jay</middleName>
        <prefix>Dr.</prefix>
        <suffix />
    </name>
    <dateOfBirth>02/01/1950</dateOfBirth>
    <dateOfDeath />
    <gender>male</gender>
    <ssn>123456789</ssn>
    <citizenship>USA</citizenship>
</Person>
```

Appendix E1 includes XML code that represents an entity from the meta-model 121 or a specialized entity from the data model 122. Appendix E2 includes XML code that expresses an instantiated specialized entity. Appendix F1 includes XML code for relations and specialized relations, while Appendix F2 includes XML code for instantiated specialized relations. Appendix G1 includes XML code for events and specialized events, while Appendix G2 includes XML code for instantiated specialized events.

Finally, Appendix H1 includes XML code for rules, while Appendix H2 includes XML code for instantiated specialized rules. In one embodiment, a rule is expressed using Rule Markup Language (RuleML). RuleML is further described at http://www.ruleml.org, and its specification is available at http://www.ruleml.org/spec/.

If a software application needs a specialized element that does not exist in the data model 122, the specialized element can be created. In the embodiments discussed above, a specialized element of the data model 122 is specified using an XML definition. Thus, a new specialized element can be defined by creating another XML definition. In one embodiment, the new specialized element is an extension of one of the generic elements of the meta-model 121.

The present invention has been described in particular detail with respect to several possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware, or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for completing at least a portion of a financial form, comprising:
   obtaining an anchor taxpayer entity comprising a taxpayer attribute, wherein the anchor taxpayer entity is a root node in a data model graph;
   identifying a first relationship element comprising a first relationship attribute, wherein the anchor taxpayer entity is a source entity of the first relationship element;
   identifying a first target entity of the first relationship element, wherein the first target entity is a first node in the data model graph and comprises a first entity attribute, and wherein the first relationship element is a first edge in the data model graph connecting the root node and the first node;
   conducting an interview, by traversing the data model graph, to assign a taxpayer value to the taxpayer attribute, a first relationship value to the first relationship attribute, and a first entity value to the first entity attribute;
   generating, using a processor and after traversing the data model graph, a plurality of financial values by applying a plurality of financial rules to a plurality of determined values, wherein the plurality of determined values comprises the taxpayer value, the first relationship value, and the first entity value, and wherein each of the plurality of financial rules is at least one selected from a group consisting of a tax law and an accounting rule; and
   populating at least the portion of the financial form using the plurality of financial values.

2. The method of claim 1, wherein the anchor taxpayer entity is at least one selected from a group consisting of a person entity, a two person entity, and a business entity.

3. The method of claim 1, further comprising:
   invoking a user prompt during the interview; and
   obtaining at least one selected from a group consisting of the taxpayer value, the first relationship value, and the first entity value from a response to the user prompt.

4. The method of claim 1, wherein at least one of the plurality of financial values is calculated using an equation associated with at least one of the plurality of financial rules, and wherein an argument to the equation comprises at least one selected from a group consisting of the taxpayer value, the first relationship value, and the first entity value.

5. The method of claim 1, further comprising:
   identifying a second relationship element comprising a second relationship attribute, wherein the anchor taxpayer entity is a source entity of the second relationship element;
   assigning a second relationship value to the second relationship attribute;
   identifying a second target entity of the second relationship element comprising a second entity attribute, wherein the second target entity is a second node in the data model graph, and wherein the second relationship element is a second edge in the data model graph connecting the root node with the second node; and
   assigning a second entity value to the second entity attribute,
   wherein the plurality of determined values further comprises the second relationship value and the second entity value.

6. The method of claim 5, wherein assigning the second relationship value and assigning the first relationship value are executed after identifying the second relationship element.

7. The method of claim 1, further comprising:
   identifying a second relationship element comprising a second relationship attribute, wherein the first target entity is a source entity of the second relationship element, and wherein the second relationship element is a second edge in the data model graph; and
   assigning a second relationship value to the second relationship attribute,
   wherein the plurality of determined values further comprises the second relationship value.

8. The method of claim 1, wherein the taxpayer attribute comprises at least one selected from a group consisting of a social security number, a birthday, a name, and a citizenship.

9. The method of claim 1, wherein the first relationship element comprises at least one selected from a group consisting of a Spouse relation, a WorkFor relation, and a Parent/Child relation.

10. A computer readable medium storing instructions to complete at least a portion of a financial form, the instructions comprising functionality to:
    obtain an anchor taxpayer entity comprising a taxpayer attribute, wherein the anchor taxpayer entity is a root node in a data model graph;
    identify a first relationship element comprising a first relationship attribute, wherein the anchor taxpayer entity is a source entity of the first relationship element;
    identify a first target entity of the first relationship element, wherein the first target entity is a first node in the data model and comprises a first entity attribute, and wherein the first relationship element is a first edge in the data model graph connecting the root node and the first node;

conduct an interview by traversing the data model graph to assign a taxpayer value to the taxpayer attribute, a first relationship value to the first relationship attribute, and a first entity value to the first entity attribute;

generate, after traversing the data model graph, a plurality of financial values by applying a plurality of financial rules to a plurality of determined values, wherein the plurality of determined values comprises the taxpayer value, the first relationship value, and the first entity value, and wherein each of the plurality of financial rules is at least one selected from a group consisting of a tax law and an accounting rule; and populate at least the portion of the financial form using the plurality of financial values.

11. The computer readable medium of claim 10, wherein the anchor taxpayer entity is at least one selected from a group consisting of a person entity, a two person entity, and a business entity.

12. The computer readable medium of claim 10, the instructions further comprising functionality to:

invoke a user prompt during the interview; and obtain at least one selected from a group consisting of the taxpayer value, the first relationship value, and the first entity value from a response to the user prompt.

13. The computer readable medium of claim 10, wherein at least one of the plurality of financial values is calculated using an equation associated with at least one of the plurality of financial rules, and wherein an argument to the equation comprises at least one selected from a group consisting of the taxpayer value, the first relationship value, and the first entity value.

14. The computer readable medium of claim 10, the instructions further comprising functionality to:

identify a second relationship element comprising a second relationship attribute, wherein the anchor taxpayer entity is a source entity of the second relationship element;

assign a second relationship value to the second relationship attribute;

identify a second target entity of the second relationship element comprising a second entity attribute, wherein the second target entity is a second node in the data model graph, and wherein the second relationship element is a second edge in the data model graph connecting the root node and the second node; and assign a second entity value to the second entity attribute, wherein the plurality of determined values further comprises the second relationship value and the second entity value.

15. The computer readable medium of claim 14, wherein the instructions to assign the second relationship value and assign the first relationship value are executed after the instructions to identify the second relationship element.

16. The computer readable medium of claim 10, the instructions further comprising functionality to:

identify a second relationship element comprising a second relationship attribute, wherein the first target entity is a source entity of the second relationship element, and wherein the second relationship element is a second edge in the data model graph; and assign a second relationship value to the second relationship attribute, wherein the plurality of determined values further comprises the second relationship value.

17. A system for completing at least a portion of a financial form, comprising:

a processor;

a data model graph comprising an anchor taxpayer entity as a root node, a relationship element as an edge, and a target entity of the relationship element as a node, wherein the anchor taxpayer is a source entity of the relationship element, and wherein the edge connects the root node and the node in the data model graph;

an interview driver configured to execute on the processor, traverse the data model graph, and assign a taxpayer value to a taxpayer attribute of the anchor taxpayer entity, a relationship value to a relationship attribute of the relationship element, and an entity value to an entity attribute of the target entity;

a transformer operatively connected to the interview driver and configured to generate, using the processor and after the data model graph is traversed, a plurality of financial values by applying a plurality of financial rules to a plurality of determined values, wherein the plurality of determined values comprises the taxpayer value, the relationship value, and the entity, and wherein each of the plurality of financial rules is at least one selected from a group consisting of a tax law and an accounting rule; and a document renderer operatively connected to the transformer and configured to populate at least the portion of the financial form using the plurality of financial values.

18. The system of claim 17, further comprising:

a plurality of prompts accessible by the interview driver, wherein at least one selected from a group consisting of the taxpayer value, the relationship value, and the entity value is obtained from a response to one of the plurality of prompts.

19. The system of claim 17, further comprising:

a visual modeler configured to create at least one selected from a group consisting of the anchor taxpayer entity, the relationship element, and the target entity; and an interview flow designer configured to define a plurality of actions to traverse the data model.

* * * * *